US011142285B2

(12) United States Patent
Futamata et al.

(10) Patent No.: US 11,142,285 B2
(45) Date of Patent: Oct. 12, 2021

(54) ELECTRIC MOTORCYCLE

(71) Applicant: HONDA MOTOR CO., LTD., Tokyo (JP)

(72) Inventors: Takeshi Futamata, Wako (JP); Kiyoshi Yanagita, Wako (JP); Kunihiro Notsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 16/633,243

(22) PCT Filed: Jun. 19, 2018

(86) PCT No.: PCT/JP2018/023241
§ 371 (c)(1),
(2) Date: Jan. 23, 2020

(87) PCT Pub. No.: WO2019/049462
PCT Pub. Date: Mar. 14, 2019

(65) Prior Publication Data
US 2020/0172196 A1 Jun. 4, 2020

(30) Foreign Application Priority Data
Sep. 11, 2017 (JP) .............................. JP2017-173972

(51) Int. Cl.
*B62M 7/06* (2006.01)
*B62J 41/00* (2020.01)
(Continued)

(52) U.S. Cl.
CPC ................ *B62M 7/06* (2013.01); *B62J 41/00* (2020.02); *B62J 43/16* (2020.02); *B62K 19/30* (2013.01); *B62K 25/20* (2013.01); *B62K 2204/00* (2013.01)

(58) Field of Classification Search
CPC . B62M 7/06; B62J 41/00; B62J 43/16; B62K 19/30; B62K 25/20; B62K 2204/00
(Continued)

(56) References Cited

U.S. PATENT DOCUMENTS 4,327,811 A * 5/1982 Isaka ........................ B62M 7/06
123/54.4
5,501,292 A * 3/1996 Kawashima ............. B62J 43/16
180/220

(Continued)

FOREIGN PATENT DOCUMENTS

| CN | 102464071 A | 5/2012 |
| CN | 102874344 A | 1/2013 |

(Continued)

OTHER PUBLICATIONS

Indian Office Action dated Mar. 30, 2021, 6 pages.
(Continued)

*Primary Examiner* — Minnah L Seoh
*Assistant Examiner* — Myles A Harris
(74) *Attorney, Agent, or Firm* — Rankin, Hill & Clark LLP

(57) ABSTRACT

An electric motorcycle in which a driving force is transmitted to a wheel by connection with less waste. The electric motorcycle is one in which a battery is disposed in a position behind a handle and in front of a seat. A driving motor is located below the seat, and a lower part of a swing arm is supported by an attachment section provided in a pivot plate, a drive shaft that transmits a driving force output from the driving motor to a wheel being supported by the swing arm.

7 Claims, 17 Drawing Sheets

(51) Int. Cl.
*B62J 43/16* (2020.01)
*B62K 25/20* (2006.01)
*B62K 19/30* (2006.01)

(58) Field of Classification Search
USPC .................................. 180/220, 226, 227
See application file for complete search history.

(56) References Cited

U.S. PATENT DOCUMENTS

| | | | | |
|---|---|---|---|---|
| 7,255,191 B2* | 8/2007 | Baldwin | ............... | B62K 19/16 |
| | | | | 180/220 |
| 9,027,694 B2* | 5/2015 | Matsuda | ............... | B62K 11/00 |
| | | | | 180/220 |
| 10,399,638 B2* | 9/2019 | Soatti | ....................... | F16D 3/22 |
| 10,427,541 B2* | 10/2019 | Yamamoto | .......... | B60L 11/1896 |
| 10,800,478 B2* | 10/2020 | Shimizu | ............... | B62M 17/00 |
| 2006/0065462 A1* | 3/2006 | Ishida | ................... | B62K 25/20 |
| | | | | 180/227 |
| 2008/0314671 A1 | 12/2008 | Buell | | |
| 2009/0229908 A1* | 9/2009 | Ito | ........................... | B62M 7/02 |
| | | | | 180/312 |
| 2010/0078236 A1* | 4/2010 | Sasage | ................... | B62K 11/10 |
| | | | | 180/65.51 |
| 2010/0133030 A1* | 6/2010 | Johnson | ................... | B60L 50/66 |
| | | | | 180/68.5 |
| 2011/0036657 A1* | 2/2011 | Bland | .................... | B60L 50/64 |
| | | | | 180/220 |
| 2011/0259660 A1* | 10/2011 | Johnson | ................... | B60L 50/66 |
| | | | | 180/220 |
| 2012/0103706 A1* | 5/2012 | Kondo | ..................... | B62M 7/12 |
| | | | | 180/65.1 |
| 2012/0103716 A1* | 5/2012 | Fujihara | .................. | B60L 50/66 |
| | | | | 180/220 |
| 2013/0075178 A1* | 3/2013 | Petersson | ................. | B62J 17/02 |
| | | | | 180/220 |
| 2013/0168171 A1* | 7/2013 | Buell | ................... | B62K 11/04 |
| | | | | 180/220 |
| 2013/0229072 A1* | 9/2013 | Matsuda | ................ | B62K 11/04 |
| | | | | 310/53 |
| 2013/0270022 A1* | 10/2013 | Matsuda | ................ | B62K 11/00 |
| | | | | 180/220 |
| 2013/0270023 A1* | 10/2013 | Matsuda | ................ | B62K 11/00 |
| | | | | 180/220 |
| 2013/0270025 A1* | 10/2013 | Matsuda | ................ | B62K 11/00 |
| | | | | 180/220 |
| 2013/0270026 A1* | 10/2013 | Matsuda | .................. | B62M 7/02 |
| | | | | 180/220 |
| 2013/0270038 A1* | 10/2013 | Nitta | ...................... | B62K 11/04 |
| | | | | 184/6 |
| 2013/0292198 A1* | 11/2013 | Matsuda | ................ | B62K 11/04 |
| | | | | 180/220 |
| 2013/0299265 A1* | 11/2013 | Marazzi | ................ | B62K 11/04 |
| | | | | 180/220 |
| 2014/0305729 A1* | 10/2014 | Testoni | .................. | B62K 11/04 |
| | | | | 180/220 |
| 2014/0339008 A1* | 11/2014 | Matsuda | ................ | B60L 50/51 |
| | | | | 180/220 |
| 2014/0367183 A1* | 12/2014 | Matsuda | ................ | B60L 50/66 |
| | | | | 180/220 |
| 2014/0367184 A1* | 12/2014 | Matsuda | ................ | B62K 11/04 |
| | | | | 180/220 |
| 2015/0008053 A1* | 1/2015 | Matsuda | ................ | B60L 58/26 |
| | | | | 180/65.1 |
| 2015/0008061 A1* | 1/2015 | Matsuda | ................ | B60L 3/003 |
| | | | | 180/220 |
| 2015/0122568 A1* | 5/2015 | Eguchi | .................... | B62H 1/02 |
| | | | | 180/220 |
| 2015/0122570 A1 | 5/2015 | Miyashiro | | |
| 2015/0274020 A1* | 10/2015 | Matsuda | ................ | B60L 50/51 |
| | | | | 701/70 |
| 2015/0291046 A1* | 10/2015 | Kawabata | ............... | B60L 50/66 |
| | | | | 180/220 |
| 2015/0329174 A1* | 11/2015 | Inoue | ...................... | B62J 99/00 |
| | | | | 429/71 |
| 2015/0329175 A1* | 11/2015 | Inoue | ...................... | B60L 50/51 |
| | | | | 307/10.1 |
| 2015/0329176 A1* | 11/2015 | Inoue | ...................... | B60K 1/04 |
| | | | | 180/220 |
| 2015/0344093 A1* | 12/2015 | Inoue | ...................... | B62M 7/04 |
| | | | | 180/220 |
| 2016/0023715 A1* | 1/2016 | Huber | .................... | B62M 23/02 |
| | | | | 180/220 |
| 2016/0056482 A1* | 2/2016 | Otsuka | .............. | H01M 8/04089 |
| | | | | 180/220 |
| 2016/0226344 A1* | 8/2016 | Matsuda | ................. | B60K 1/00 |
| 2016/0240900 A1* | 8/2016 | Testoni | ............. | H01M 10/6557 |
| 2017/0282749 A1* | 10/2017 | Yamamoto | .............. | B60L 58/33 |
| 2018/0050754 A1* | 2/2018 | Jacobs | ....................... | B62J 6/00 |
| 2019/0329836 A1* | 10/2019 | Buell | ...................... | B62K 19/46 |
| 2020/0130498 A1* | 4/2020 | Matsushima | .......... | H02K 11/33 |
| 2020/0339210 A1* | 10/2020 | Buell | ..................... | B62K 19/12 |
| 2020/0398933 A1* | 12/2020 | Shirasuna | ................ | B62M 7/02 |
| 2021/0001953 A1* | 1/2021 | Shirasuna | ................ | B62M 7/02 |

FOREIGN PATENT DOCUMENTS

| | | | | |
|---|---|---|---|---|
| CN | 104010929 A | | 8/2014 | |
| CN | 105764788 A | | 7/2016 | |
| EP | 2096023 A2 | * | 9/2009 | ............ B62J 43/00 |
| EP | 2202140 A1 | * | 6/2010 | ............ B62K 19/30 |
| JP | S52-124631 | | 10/1977 | |
| JP | H04-151386 | | 5/1992 | |
| JP | 2988993 B2 | * | 12/1999 | |
| JP | 3172952 B2 | * | 6/2001 | ............ B62J 9/18 |
| JP | 3247989 B2 | * | 1/2002 | ............ B62M 7/12 |
| JP | 2004210072 A | * | 7/2004 | |
| JP | 2004210073 A | * | 7/2004 | |
| JP | 2009-001264 | | 1/2009 | |
| JP | 2009-051358 | | 3/2009 | |
| JP | 2013-184628 | | 9/2013 | |
| JP | 2013209079 A | * | 10/2013 | ............ B62M 7/04 |
| JP | 2014-507330 | | 3/2014 | |
| JP | 2016-172534 | | 9/2016 | |
| JP | 2017-501920 | | 1/2017 | |
| JP | 6193304 B2 | | 9/2017 | |
| WO | 2012/063293 | | 5/2012 | |
| WO | WO-2017168719 A1 | * | 10/2017 | ............ B62K 25/20 |
| WO | WO-2019170306 A1 | * | 9/2019 | ............ B62K 19/40 |

OTHER PUBLICATIONS

International Preliminary Report on Patentability issued in International application No. PCT/JP2018/023241, 6 pages.
Chinese Office Action dated Dec. 2, 2020, 8 pages.
International Search Report, dated Apr. 9, 2018, 4 pages.
Written Opinion of the International Searching Authority, dated Oct. 15, 2019, 7 pages.
International Preliminary Report on Patentability, dated Jan. 6, 2020, 8 pages.
Written Opinion of the International Searching Authority, dated Sep. 4, 2018, 5 pages.
Chinese Office Action dated Jul. 20, 2021, 7 pages.

* cited by examiner

ELECTRIC MOTORCYCLE

TECHNICAL FIELD

The present invention relates to an electric motorcycle.

BACKGROUND ART

An electric motorcycle in which a battery is disposed in a vehicle body front of a motorcycle has been publicly known (see, for example, Patent Literature 1). In Patent Literature 1, a rear suspension extending downward to the rear is disposed below a seat and an electric motor is disposed below the rear suspension. The electric motor is disposed below a vehicle body away from the seat. A driving force is transmitted from the electric motor to a rear wheel via a transmission member. A swing arm supporting the rear wheel is coupled to a pivot point and extends substantially horizontally.

CITATION LIST

Patent Literature

Patent Literature 1: Japanese Patent Laid-Open No. 2014-507330

SUMMARY OF INVENTION

Technical Problem

In the related art, the swing arm extends from the rear wheel to the rear of the electric motor in a substantially horizontal state. However, since the electric motor is disposed below the vehicle body, it is difficult to effectively use the space of the vehicle body.

The present invention has been devised in view of the circumstances described above, and an object of the present invention is to provide, considering all together a layout of a battery and a motor to a layout of a driving system, an electric motorcycle in which a driving force is transmitted to a wheel by connection with less waste.

Solution to Problem

This specification includes the entire content of Japanese Patent Application No. 2017-173972 filed on Sep. 11, 2017.

The present invention provides an electric motorcycle in which a battery (60) is disposed in a position behind a handle (15) and in front of a seat (14), wherein a driving motor (11) is located below the seat (14), and a lower part of a swing arm (13) is supported by an attachment section (21a, 21a) provided in a pivot plate (21, 21), a drive shaft (43) that transmits a driving force output from the driving motor (11) to a wheel (3) being supported by the swing arm (13).

In the invention described above, the attachment section (21a, 21a) may be a through-hole (21a, 21a) provided in a height position substantially in a center of the pivot plate (21, 21), and a pivot shaft (50) supporting a lower part of the swing arm (13) may be supported in the through-hole (21a, 21a).

In the invention described above, a radiator (80) and a radiator fan (85, 85) may be disposed in a position below the seat (14) and behind the driving motor (11).

In the invention described above, a PCU (70) may be disposed above the battery (60) and in front of the driving motor (11).

In the invention described above, at least a part (11b) of the driving motor (11) may be located above the battery (60).

In the invention described above, a front lower part (11c) of the driving motor (11) may be located in a rear end upper part (60c) of the battery (60).

Advantageous Effects of Invention

In an electric motorcycle according to the present invention, a battery is disposed in a position behind a handle and in front of a seat, a driving motor is located below the seat, a lower part of a swing arm is supported by attachment sections provided in pivot plates, a drive shaft that transmits a driving force output from the driving motor to a wheel being supported by the swing arm. With this configuration, since the lower part of the swing arm is supported by the attachment sections provided in the pivot plates, the drive shaft faces upward to the front and it is possible to connect the drive shaft without waste to the driving motor located on an extended line of the drive shaft and located below the seat.

In the invention described above, the attachment sections may be through-holes provided in a height position substantially in a center of the pivot plates, and a pivot shaft supporting a lower part of the swing arm may be supported in the through-holes. With this configuration, since the lower part of the swing arm is supported by the pivot shaft supported in the through-holes provided in the height position substantially in the center of the pivot plates, the drive shaft passes above the pivot shaft and it is possible to direct the drive shaft upward to the front and to be easily brought close to the driving motor.

In the invention described above, a radiator and radiator fans may be disposed in a position below the seat and behind the driving motor. With this configuration, it is possible to cool the radiator with the radiator fans and also cool the driving motor located right in front of the radiator with exhaust air of the fans.

In the invention described above, a PCU may be disposed above the battery and in front of the driving motor. With this configuration, it is possible to bring a layout of the electric motorcycle having a limited loading space close to the optimum. In particular, since the PCU is located in the front of the radiator fans across the driving motor, it is possible to cool the radiator and also cool the driving motor located right in front of the radiator and the PCU with exhaust air of the fans.

In the invention described above, at least a part of the driving motor may be located above the battery. With this configuration, it is possible to bring a layout of the electric motorcycle having a limited loading space close to the optimum.

In the invention described above, a front lower part of the driving motor may be located in a rear end upper part of the battery. With this configuration, it is possible to bring a layout of the electric motorcycle having a limited loading space close to the optimum.

DESCRIPTION OF EMBODIMENTS

An embodiment of the present invention is explained below with reference to the drawings. Note that, in the explanation, descriptions of directions such as the front and the rear, the left and the right, and up and down are the same as directions with respect to a vehicle body unless particularly described otherwise. A sign FR shown in the figures indicates a vehicle body forward direction, a sign UP indicates a vehicle body upward direction, and a sign LH indicates a vehicle body leftward direction.

Figure 1:
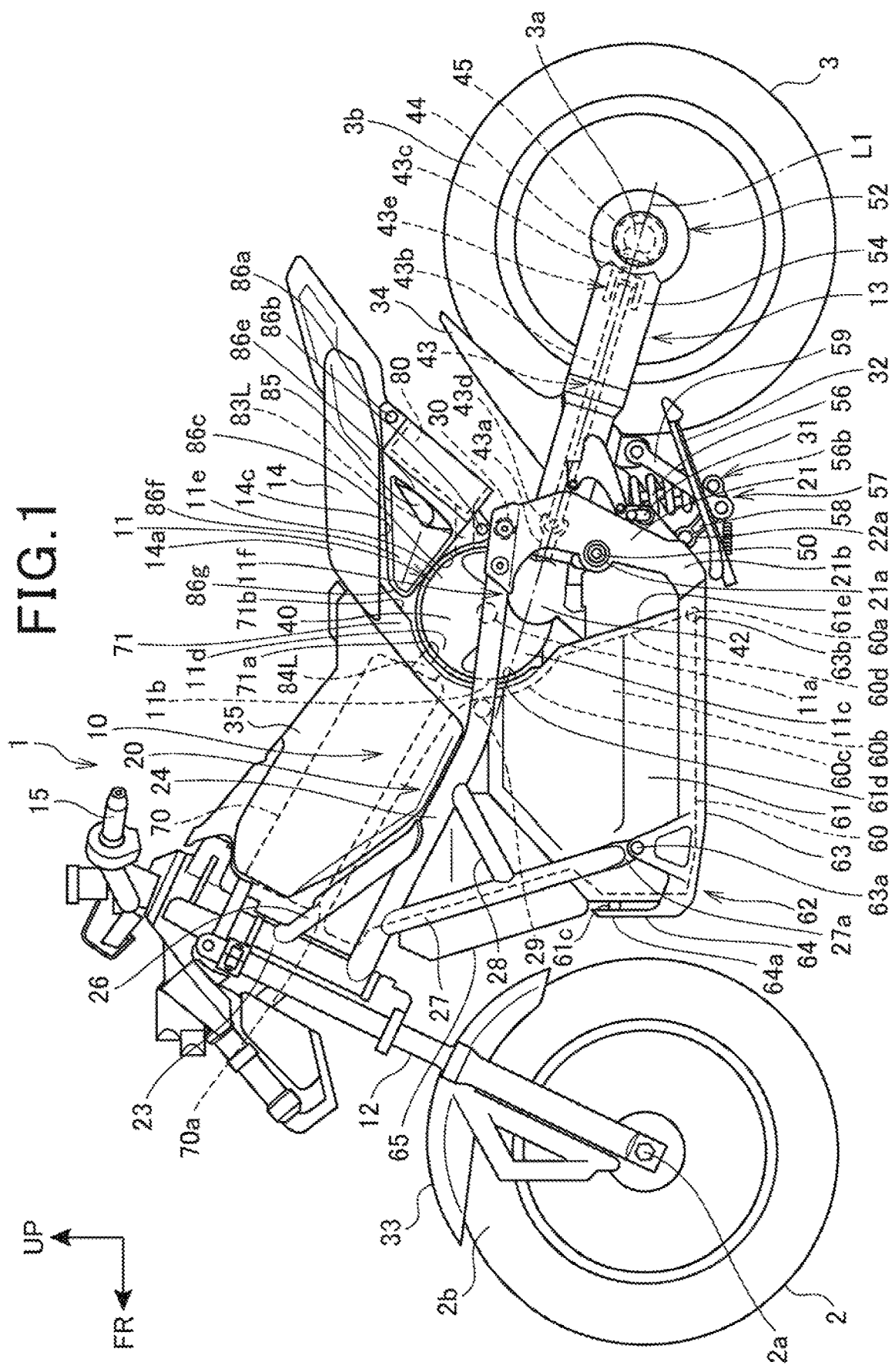
FIG. 1 is a left side view of an electric motorcycle according to an embodiment of the present invention.
Figure 2:
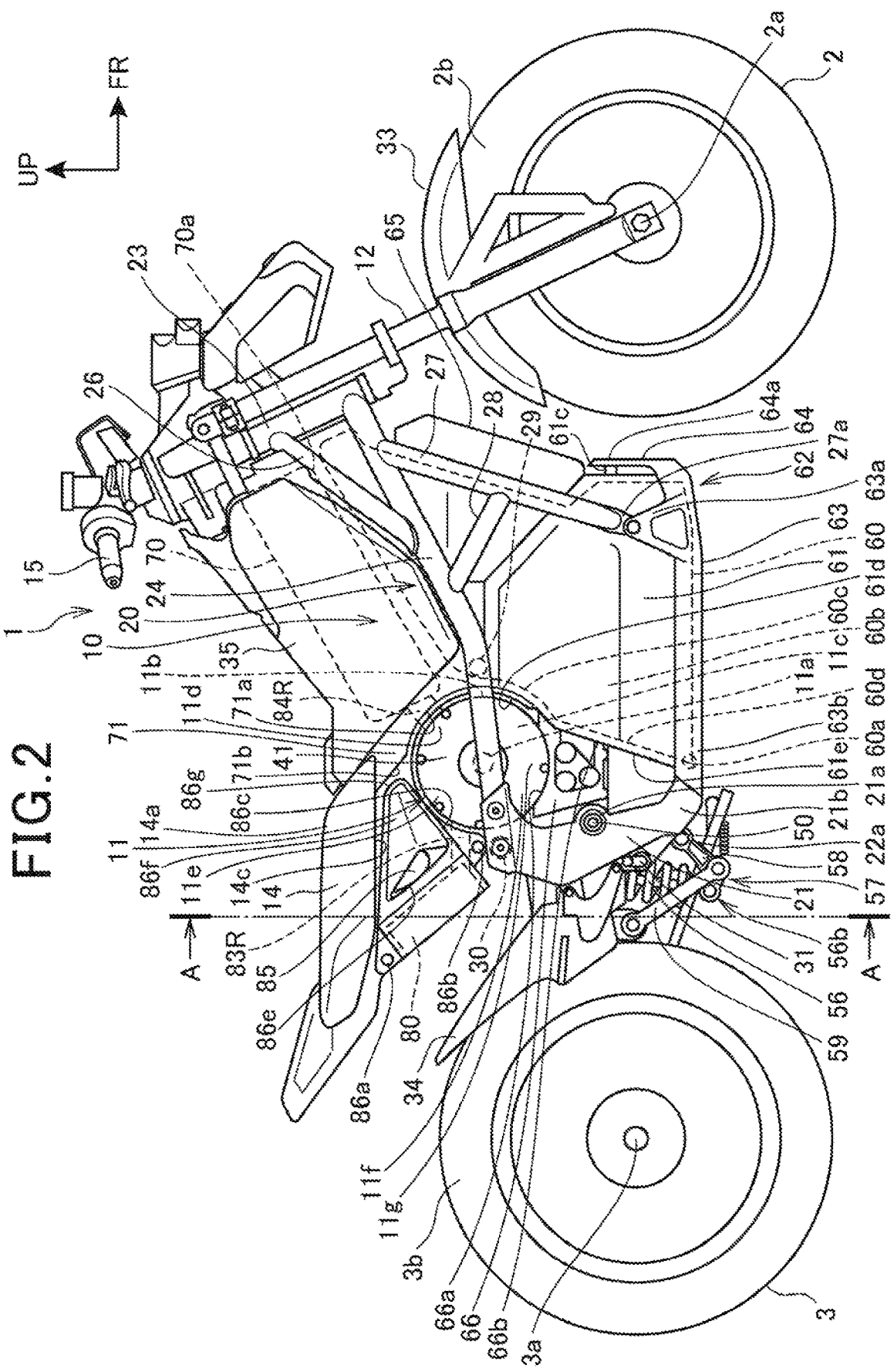
FIG. 2 is a right side view of the electric motorcycle according to the embodiment of the present invention.
Figure 3:
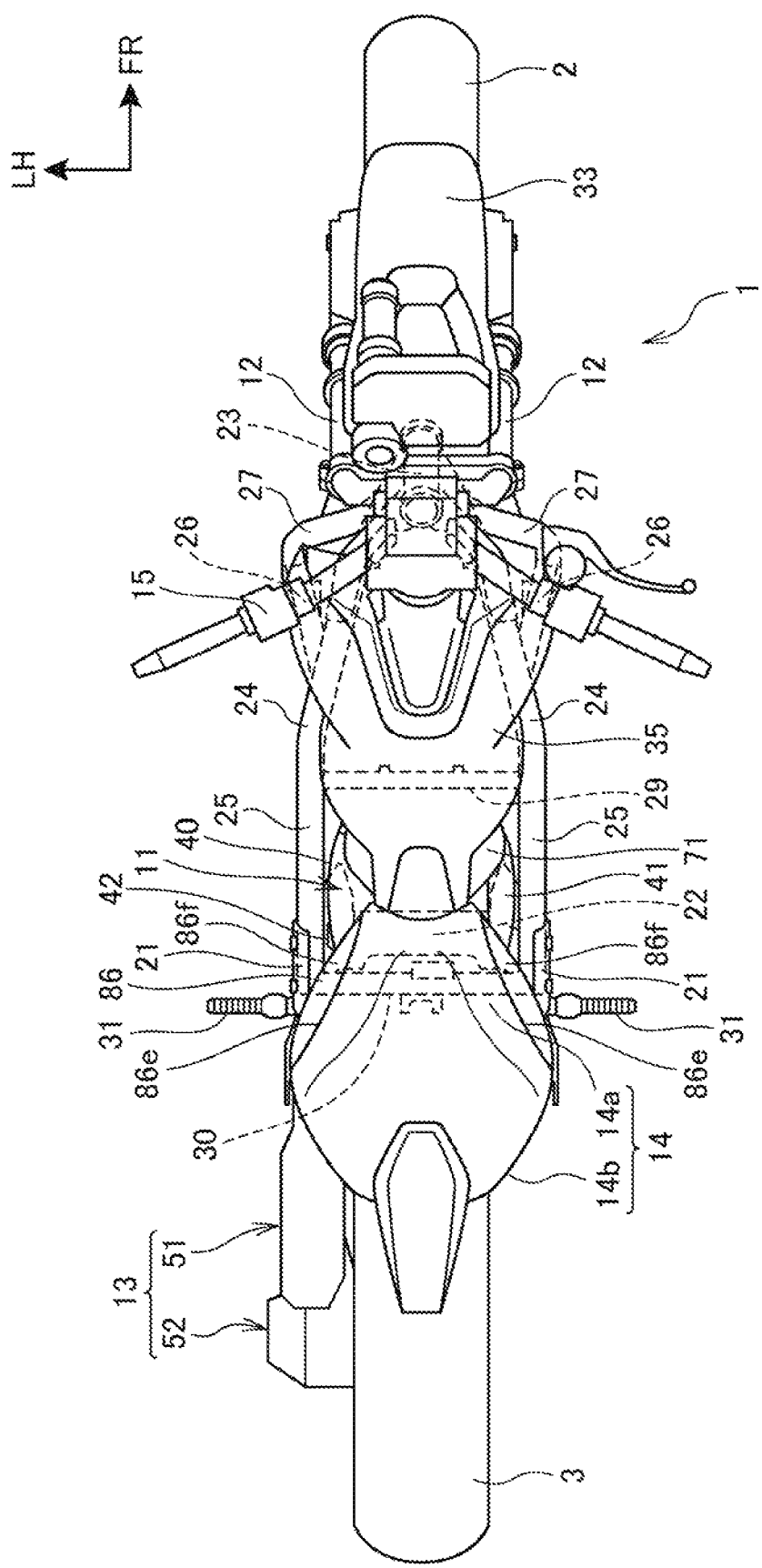
FIG. 3 is a plan view of the electric motorcycle according to the embodiment of the present invention.
Figure 4:
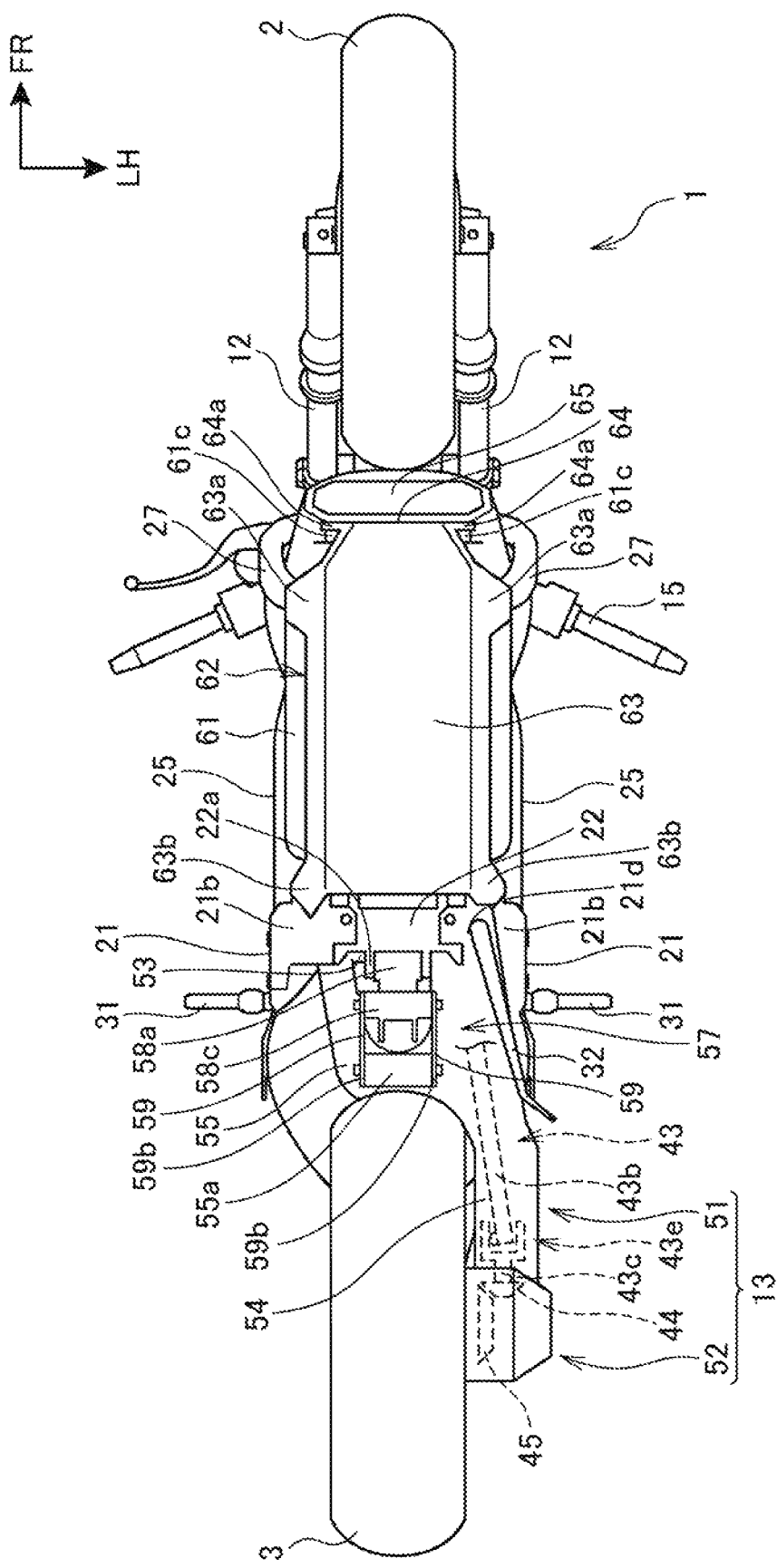
FIG. 4 is a bottom view of the electric motorcycle according to the embodiment of the present invention.
Figure 5:
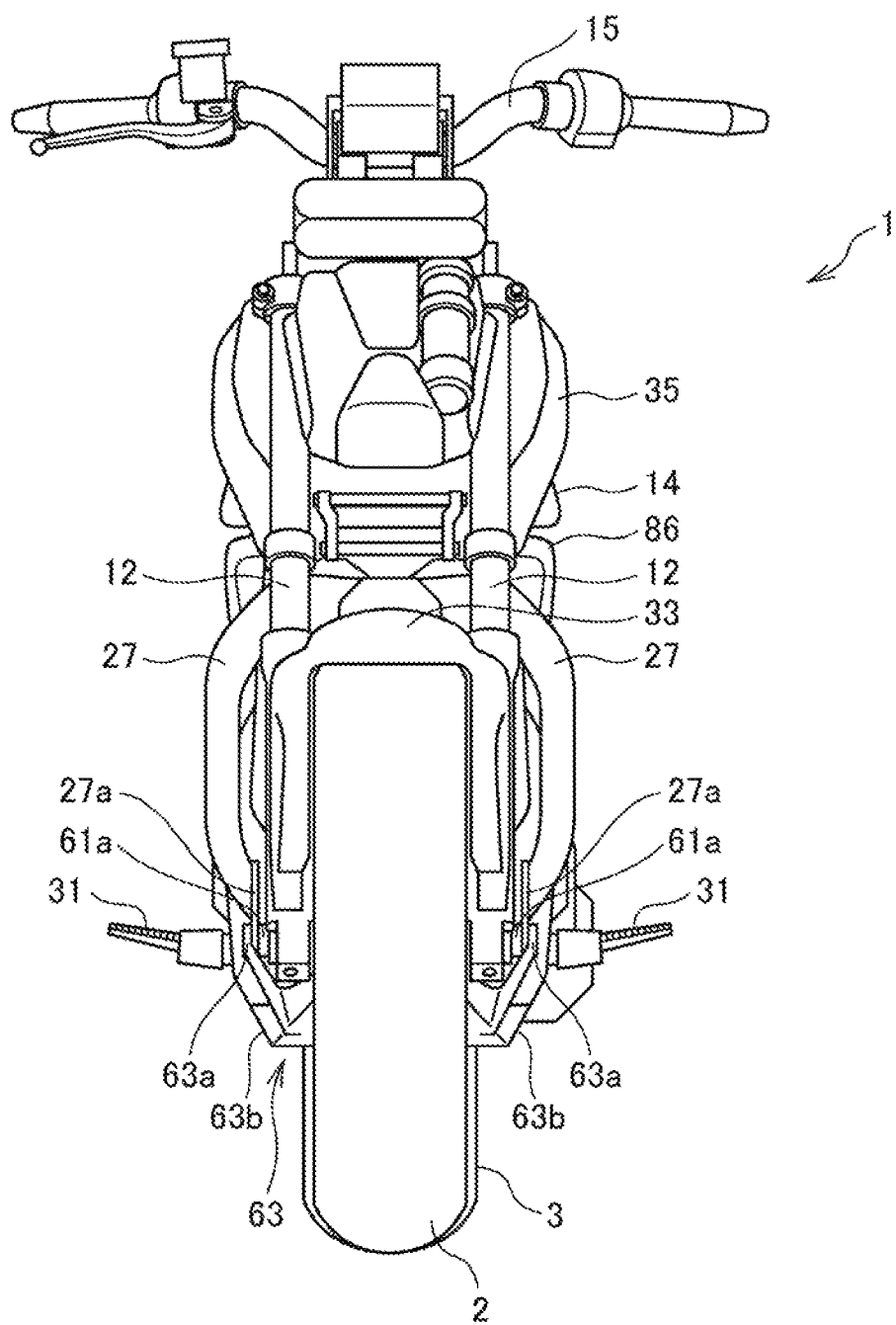
FIG. 5 is a front view of the electric motorcycle according to the embodiment of the present invention.
Figure 6:
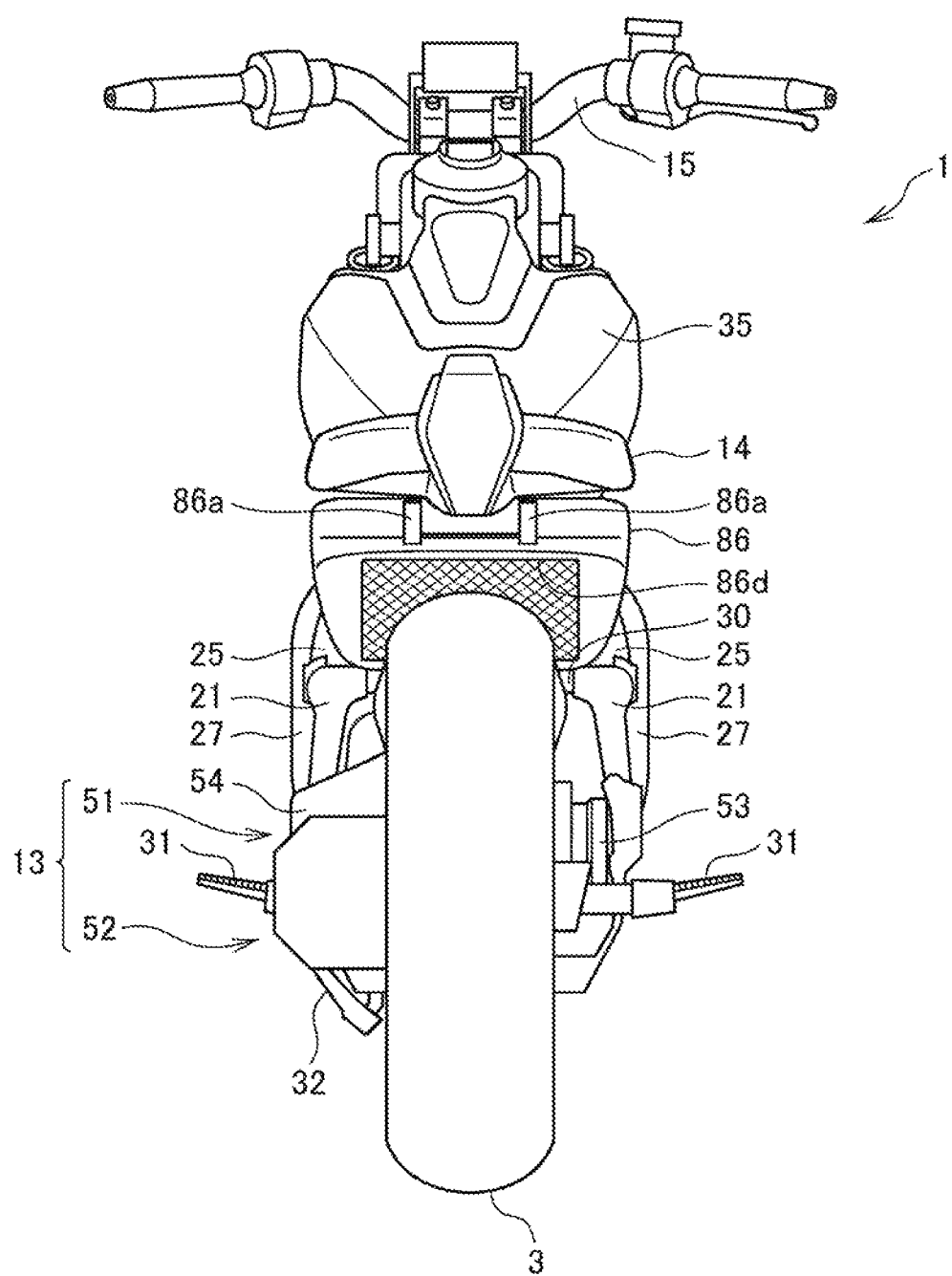
FIG. 6 is a rear view of the electric motorcycle according to the embodiment of the present invention.

FIG. 1 is a left side view of a battery-driven electric motorcycle 1 according to the embodiment of the present invention. FIG. 2 is a right side view of the electric motorcycle 1, FIG. 3 is a plan view of the electric motorcycle 1, FIG. 4 is a bottom view of the electric motorcycle 1, FIG. 5 is a front view of the electric motorcycle 1, and FIG. 6 is a rear view of the electric motorcycle 1.

As shown in FIG. 1 to FIG. 6, the electric motorcycle 1 is a vehicle in which a battery-driven electric motor (driving motor) 11 is supported by a vehicle body frame 10, a front fork 12 supporting a front wheel 2 is steerably supported at the front end of the vehicle body frame 10, and a swing arm 13 supporting a rear wheel (a wheel) 3 is provided on the rear side of the vehicle body frame 10. The electric motorcycle 1 is a saddle-riding vehicle in which a seat 14, on which an occupant sits astride, is provided above a rear part of the vehicle body frame 10.

As shown in FIGS. 1 and 2, the front fork 12 is supported via a steering shaft axially supported by a head pipe 23. The front wheel 2 is axially supported at the lower end part of the front fork 12 via an axle 2a. A handle 15 operated by the occupant is provided at the upper end of the front fork 12.

The vehicle body frame 10 includes a main frame 20, a pair of left and right pivot plates 21, 21 supported in the rear of the main frame 20, and a cross frame 22 (FIG. 4) coupling lower end parts 21b, 21b of the pivot plates 21, 21.

The seat 14, on which the occupant sits, is supported above the rear end part of the main frame 20 (above a rear-side upper cross frame 30).

A pair of left and right steps 31, 31, on which the occupant puts feet, is supported further in the lower side rear than the up-down direction center of the pivot plates 21, 21. A side stand 32, which parks the electric motorcycle 1 in a state inclined to the left side, is attached to a lower part of the pivot plate 21 on the left side.

A front fender 33 covering the front wheel 2 from above is provided in the front fork 12. A rear fender 34 covering the rear wheel 3 from front above is attached to the swing arm 13. A front upper part of the vehicle body is covered by a vehicle body cover 35.

A columnar electric motor (driving motor) 11 extending in the vehicle width direction is disposed below a front part of the seat 14. A battery 60 is disposed in a front lower part of the electric motor 11. A PCU (power control unit) 70 is disposed above the battery 60.

As shown in FIG. 1, a leading end shaft 43a of a drive shaft 43 extending in the vehicle front-rear direction is coupled to an output shaft 11a of the electric motor 11 via a gear train (not shown in the figure) of a transmission unit 42, the position of which overlaps a rear lower part 11f of the electric motor 11 in a vehicle side view. The drive shaft 43 includes the leading end shaft 43a, a shaft body section 43b coupled to the leading end shaft 43a by a universal joint section 43d, and a rear end shaft 43c coupled to the shaft body section 43b by a tripod constant velocity joint section 43e. A bevel gear 44 is supported by the rear end shaft 43c.

A ring gear 45 rotating integrally with the rear wheel 3 is in mesh with the bevel gear 44. A driving force transmitted from the electric motor 11 to the drive shaft 43 is transmitted to the rear wheel 3 via the bevel gear 44 and the ring gear 45.

The drive shaft 43 is supported by the swing arm 13. The swing arm 13 includes a swing arm body 51 axially supported by a pivot shaft 50 and extending backward and a gear case 52 joined to the rear end of the swing arm body 51 and supporting the rear wheel 3.

The swing arm body 51 includes a front-side tubular section 53 (FIG. 4) extending in the vehicle width direction, the pivot shaft 50 being inserted through the front-side tubular section 53, an arm section 54 extending from the left end (one end) of the front-side tubular section 53 to the left side surface side (one side surface side) of the rear wheel 3 above the front-side tubular section 53, and a reinforcing arm section 55 (FIG. 4) extending backward from the right end (the other end) of the front-side tubular section 53, bent to the left side (one side), and joined to a front-rear direction intermediate part of the arm section 54.

The arm section 54 is formed hollow. The drive shaft 43 is disposed on the inside of the arm section 54. The drive shaft 43 passes above the pivot shaft 50 (FIG. 1).

The rear end part of the arm section 54 is coupled to an axle 3a (FIG. 2) of the rear wheel 3. The front end side of the swing arm 13 is swingably coupled to the pivot plates 21, 21 via a pivot shaft 50 that pierces through between the pair of left and right pivot plates 21, 21. The rear end part of the swing arm 13 swings in the up-down direction centering on the pivot shaft 50.

The battery 60 functioning as a power source for the electric motor 11 is disposed in a front part of the electric motorcycle 1. The battery 60 is disposed in a position behind the handle 15 and in front of the seat 14. The battery 60 in this embodiment is disposed from the rear of the handle 15 to below the handle 15 and is disposed in a position behind the head pipe 23, below the handle 15, and in front of the seat 14 in the vehicle side view. The battery 60 occupies a space from slightly above front frames 24, 24 to below the vehicle body. The battery 60 is covered by a battery cover 61 and is supported by the vehicle body frame 10 together with a battery case 62 that supports the battery 60 from below.

The battery case 62 includes a square plate-like case body section 63 extending in the front-rear direction and an erected wall-like case front surface section 64 formed at the front end of the case body section 63.

A pair of left and right triangular fastening sections 63a, 63a inclining to the vehicle width direction outer side and extending upward is formed in a front part of the case body section 63 (FIG. 5). The fastening sections 63a, 63a are fastened to, together with lower end parts 27a, 27a of down frames 27, 27, columnar sections to be fastened 61a, 61a (FIG. 5) formed in a front part of the battery cover 61 to project to the vehicle width direction outer side.

A pair of left and right fastening sections 63b, 63b is formed in a rear part of the case body section 63. The fastening sections 63b, 63b are fastened to lower front end parts of the pivot plates 21, 21.

A pair of left and right fastening sections 64a, 64a is formed in the case front surface section 64. The fastening sections 64a, 64a are fastened to columnar sections to be fastened 61c, 61c formed to project to the front surface of the battery cover 61 (FIG. 4).

As shown in FIG. 2, a unit cover 66 is disposed behind the battery cover 61. The unit cover 66 covers the transmission unit 42 (not shown in FIG. 2) from the right. An arcuate recess 66a recessed along a circular outer circumferential shape of the electric motor 11 in the vehicle side view is formed in an upper part of the unit cover 66. An arcuate lower part 11g of the electric motor 11 is disposed to enter the recess 66a. In a front part of the unit cover 66, an inclined section 66b linearly inclined downward to the rear is formed along an inclined rear part 61e of the battery cover 61.

As shown in FIG. 1 and FIG. 2, the PCU (power control unit) 70 is disposed above the battery 60. The PCU 70 controls driving and power generation (regeneration) of the electric motor 11. The PCU 70 is disposed upward to the front in the vehicle side view. A front lower part 70a of the PCU 70 overlaps reinforcing frames 26, 26. The PCU 70 is housed in a PCU case 71.

In a rear end lower part of the PCU case 71, an arcuate recess 71a recessed along the circular outer circumferential shape of the electric motor 11 in the vehicle side view is formed. In this embodiment, the rear end lower part of the PCU case 71 is a portion of the PCU case 71 below the seat 14, above rear frames 25, 25, and behind a front-side upper cross frame 29 in the vehicle side view. An inclined section 71b extending upward to the rear in the vehicle side view is formed in a rear part of the PCU case 71. The inclined section 71b is linearly inclined from the rear part of the recess 71a to below a front part 14a of the seat 14.

An arcuate front upper part 11d of the electric motor 11 is disposed to enter the arcuate recess 71a of the PCU case 71. The PCU 70 and the electric motor 11 are easily disposed close to each other. Since the front upper part 11d of the electric motor 11 is located in the recess 71a in a rear end lower part of the PCU case 71, in the electric motorcycle 1 having a limited loading space, a space is effectively used to obtain an optimum layout.

The electric motor 11 is disposed below the seat 14. The output shaft 11a extending in the vehicle width direction of the electric motor 11 is disposed to correspond to the height of tires 2b, 3b portions in upper parts of the front wheel 2 and the rear wheel 3 (FIG. 1 and FIG. 2). Since the position of the electric motor 11 is high, the transmission unit 42 and the like can be disposed below the electric motor 11.

Figure 7:
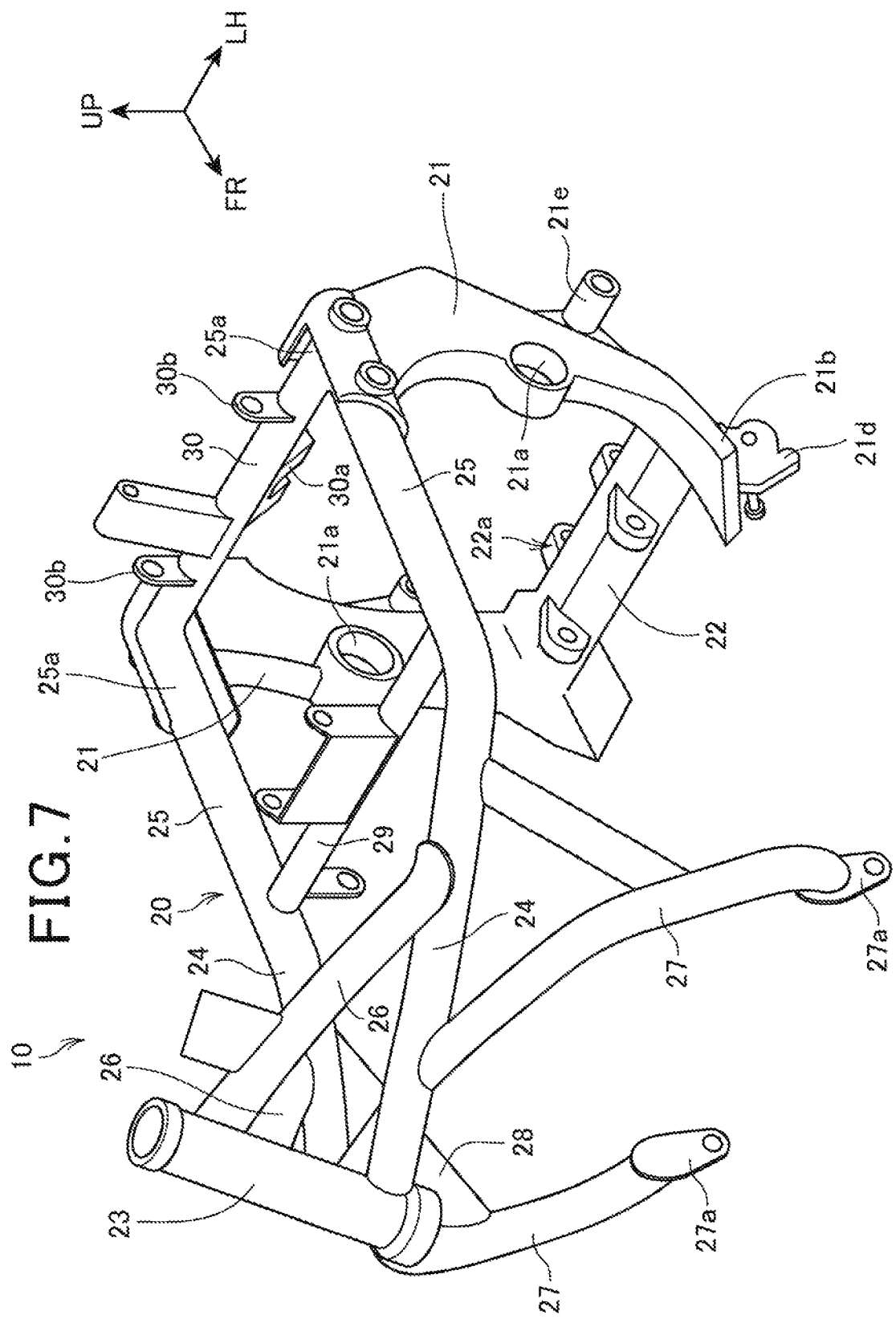
FIG. 7 is a perspective view of a vehicle body frame of the electric motorcycle.
Figure 8:
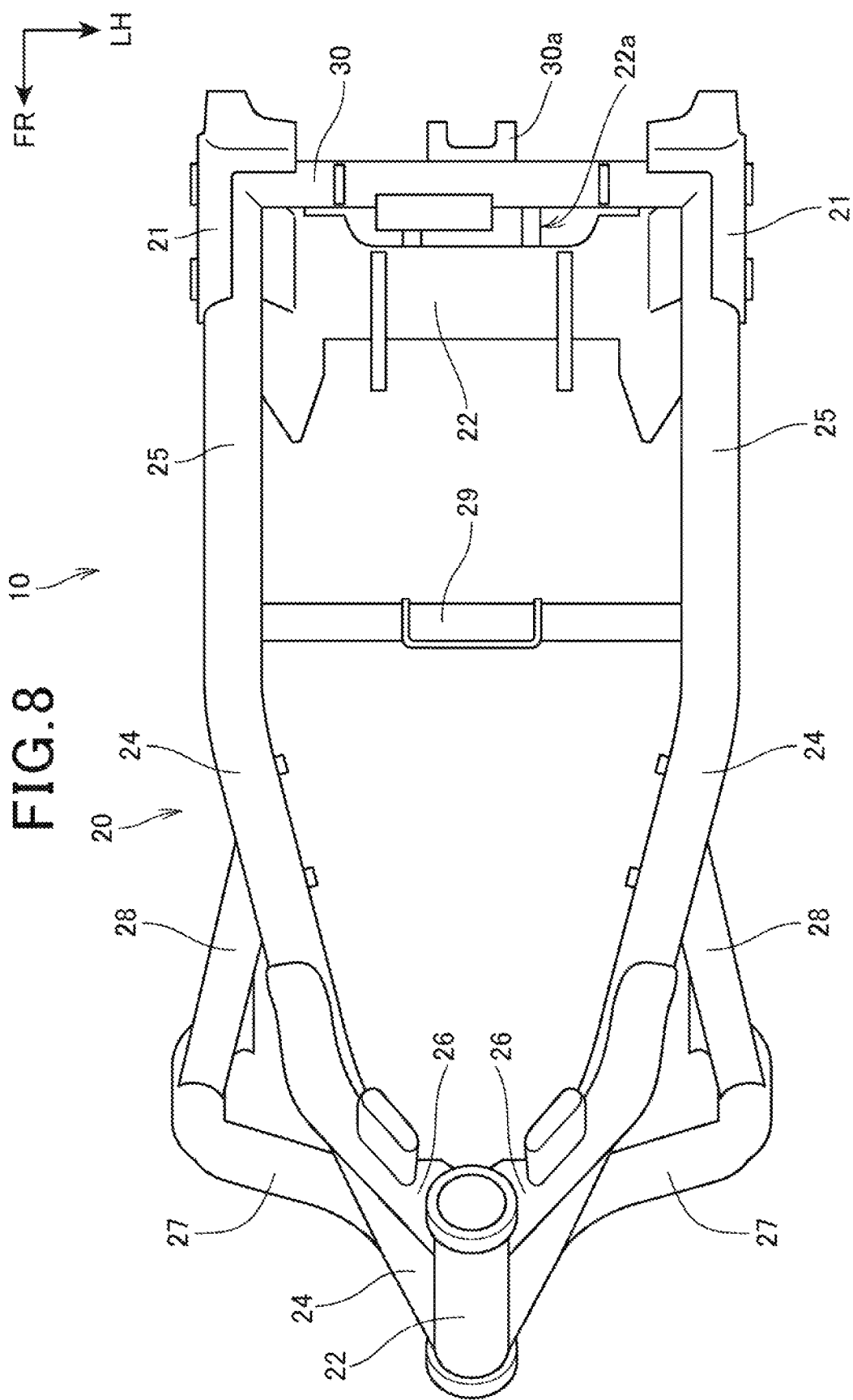
FIG. 8 is a plan view of the vehicle body frame of the electric motorcycle.
Figure 9:
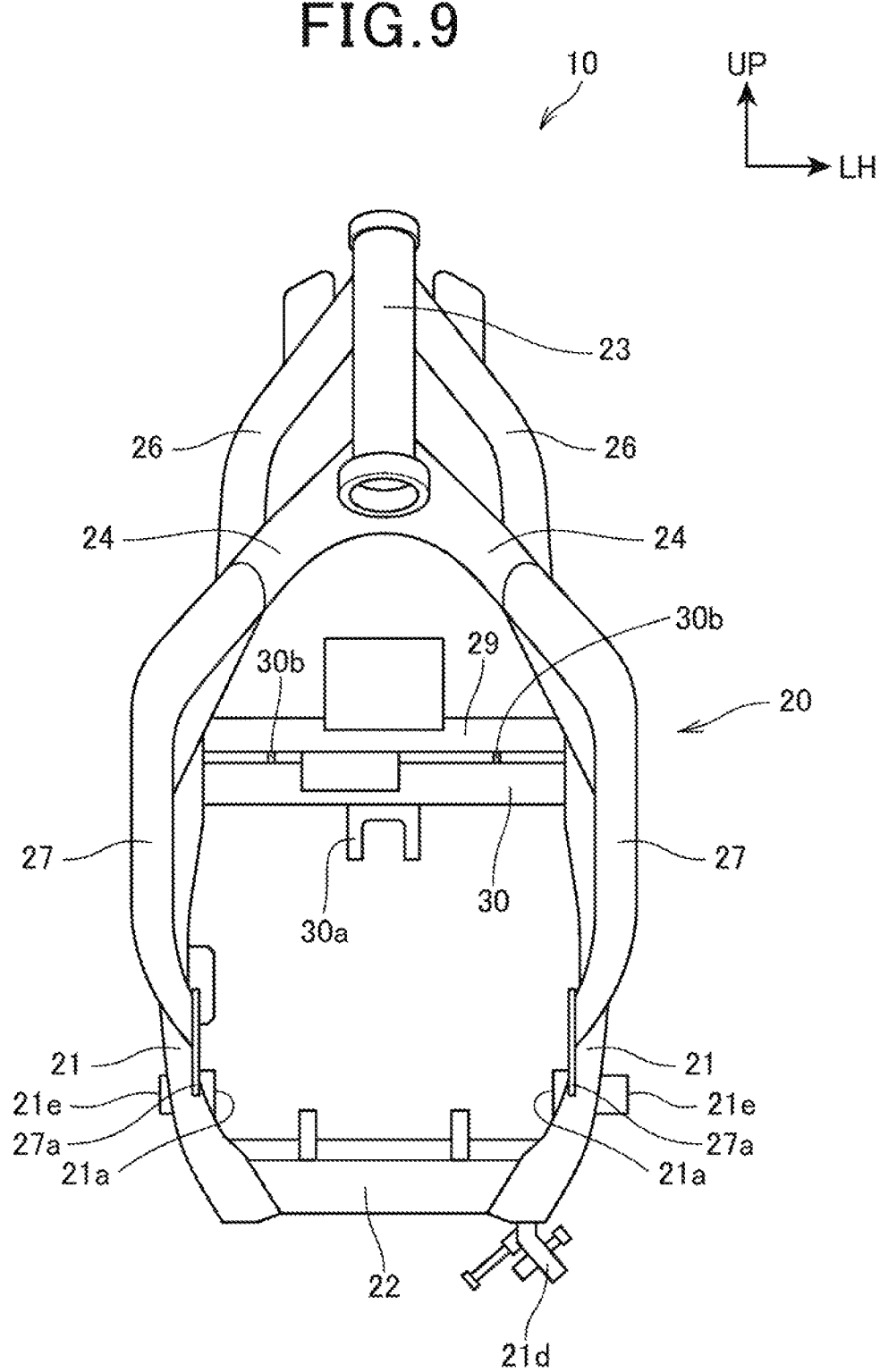
FIG. 9 is a front view of the vehicle body frame of the electric motorcycle.
Figure 10:
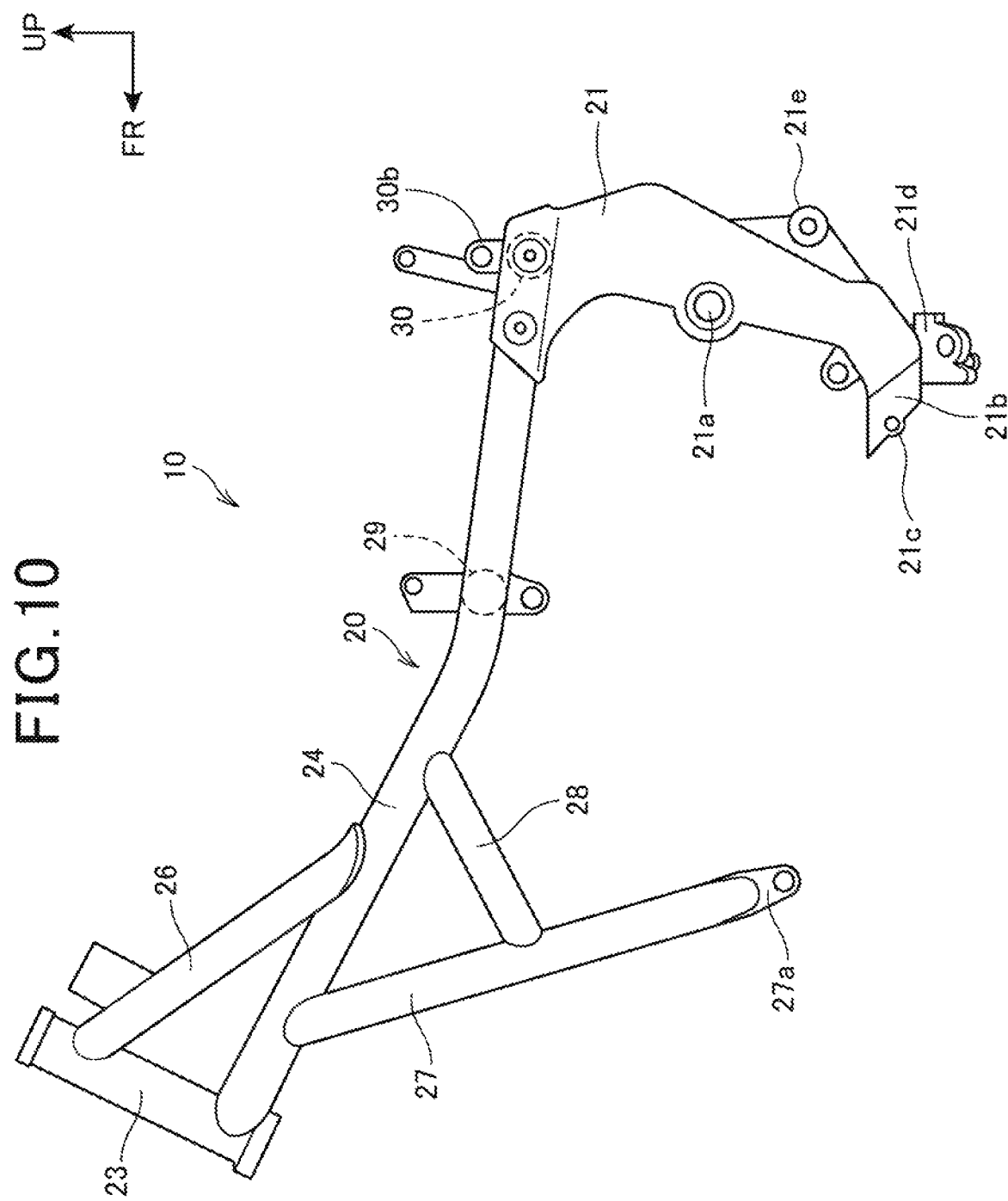
FIG. 10 is a left side view of the vehicle body frame of the electric motorcycle.

FIG. 7 is a perspective view of the vehicle body frame 10 of the electric motorcycle 1. FIG. 8 is a plan view of the vehicle body frame 10, FIG. 9 is a front view of the vehicle body frame 10, and FIG. 10 is a left side view of the vehicle body frame 10.

The main frame 20 of the vehicle body frame 10 includes the head pipe 23 that steerably supports the front fork 12 at the front end of the main frame 20, the front frames 24, 24 extending downward to the rear while expanding from a lower part of the head pipe 23 to the vehicle width direction outer side, and the rear frames 25, 25 linearly extending downward to the rear from the rear end parts of the front frames 24, 24 at a gentle inclination compared with the front frames 24, 24.

The main frame 20 includes a pair of left and right reinforcing frames 26, 26 that couples an upper part of the head pipe 23 and intermediate parts of the front frames 24, 24, a pair of left and right down frames 27, 27 extending downward from front parts of the front frames 24, 24 to swell to the vehicle width direction outer side, and coupling frames 28, 28 that couple intermediate parts of the down frames 27, 27 and rear parts of the front frames 24, 24.

Further, the main frame 20 includes the front-side upper cross frame 29 that connects front end parts of the rear frames 25, 25 to the left and the right, and the rear-side upper cross frame 30 that connects rear end parts of the rear frames 25, 25 to the left and the right.

The pivot plates 21, 21 of the vehicle body frame 10 extend downward from rear end parts 25a, 25a of the rear frames 25, 25. Through-holes 21a, 21a, in which the pivot shaft 50 (not shown in FIG. 7 to FIG. 10) is supported, are formed in front parts of up-down direction centers of the pivot plates 21, 21.

Holes 21e, 21e are provided in lower side rear parts of the through-holes 21a, 21a. The steps 31, 31 (not shown in FIG. 7 to FIG. 10) are attached to the holes 21e, 21e. The fastening sections 63b, 63b (not shown in FIG. 7 to FIG. 10) of the case body section 63 are fastened to lower front end parts 21c, 21c of the pivot plates 21, 21. A side stand stay 21d, by which the side stand 32 (not shown in FIG. 7 to FIG. 10) is supported, is formed at the lower end part of the pivot plate 21 on the left side.

The cross frame 22 of the vehicle body frame 10 couples the lower end parts 21b, 21b of the pivot plates 21, 21 in the left-right direction.

Figure 11:
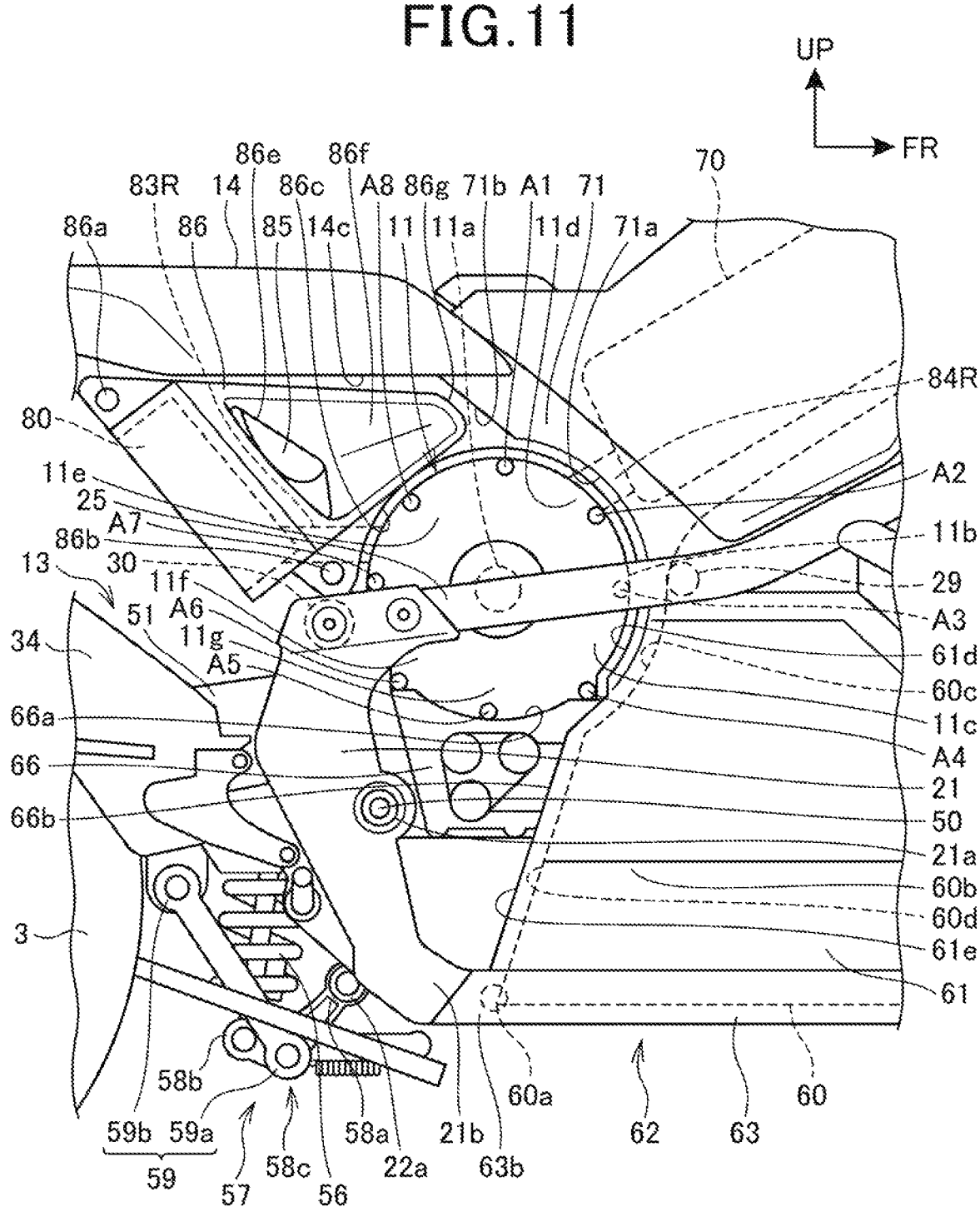
FIG. 11 is an enlarged view of a peripheral portion of an electric motor shown in FIG. 2.

FIG. 11 is an enlarged view of a peripheral portion of the electric motor 11 shown in FIG. 1.

As shown in FIG. 11, the electric motor 11 is disposed between the front-side upper cross frame 29 and the rear-side upper cross frame 30. The output shaft 11a extending in the vehicle width direction is supported in a position overlapping the rear frames 25, 25 in the vehicle side view. The electric motor 11 includes a bottomed cylindrical motor case 40 (FIG. 1) in which an opening section (not shown in the figure) is formed in a right part. The opening section is closed by a disk-like motor cover 41.

The motor cover 41 is fastened to the motor case 40 in positions A1 to A8 formed at equal intervals on a circumference in eight places in total including front, rear, upper, and lower four places and four places among the front, rear, upper, and lower places. Note that, when position portions such as a front upper part and a front lower part of the circular electric motor 11 are shown in the vehicle side view, for convenience, the position portions are explained using the positions A1 to A8.

A front end part 11b of the electric motor 11 means a portion of the front position A3 in the vehicle side view.

A front lower part 11c of the electric motor 11 means a position portion including at least the portion of the front lower position A4 and present within a range of an arc from the front position A3 to the lower position A5 in the vehicle side view. In this embodiment, the front lower part 11c means a position portion of an arc of the electric motor 11 having the front position A3 and the front lower position A4 as both ends.

A front upper part 11a of the electric motor 11 means a position portion including at least the portion of the front upper position A2 and present within a range of an arc from the upper position A1 to the front position A3 in the vehicle side view. In this embodiment, the front upper part 11d means a position portion of an arc of the electric motor 11 having the upper position A1 and the front position A3 as both ends.

A rear upper part 11e of the electric motor 11 means a position portion including at least the portion of the rear upper position A8 and present within a range of an arc from the rear position A7 to the upper position A1 in the vehicle side view. In this embodiment, the rear upper part 11e means a position portion of an arc of the electric motor 11 having the rear position A7 and the upper position A1 as both ends.

The rear lower part 11f of the electric motor 11 means a position portion including at least the portion of the rear lower position A6 and present within a range of an arc from the lower position A5 to the rear position A7 in the vehicle side view. In this embodiment, the rear lower part 11f means a position portion of an arc of the electric motor 11 having the lower position A5 and the rear position A7 as both ends.

The lower part 11g of the electric motor 11 means a position portion including at least the portion of the lower position A5 and present within a range of an arc from the front lower position A4 to the rear lower position A6 in the vehicle side view. In this embodiment, the lower part 11g means a position portion of an arc of the electric motor 11 having the front lower position A4 and the rear lower position A6 as both ends.

Figure 12:
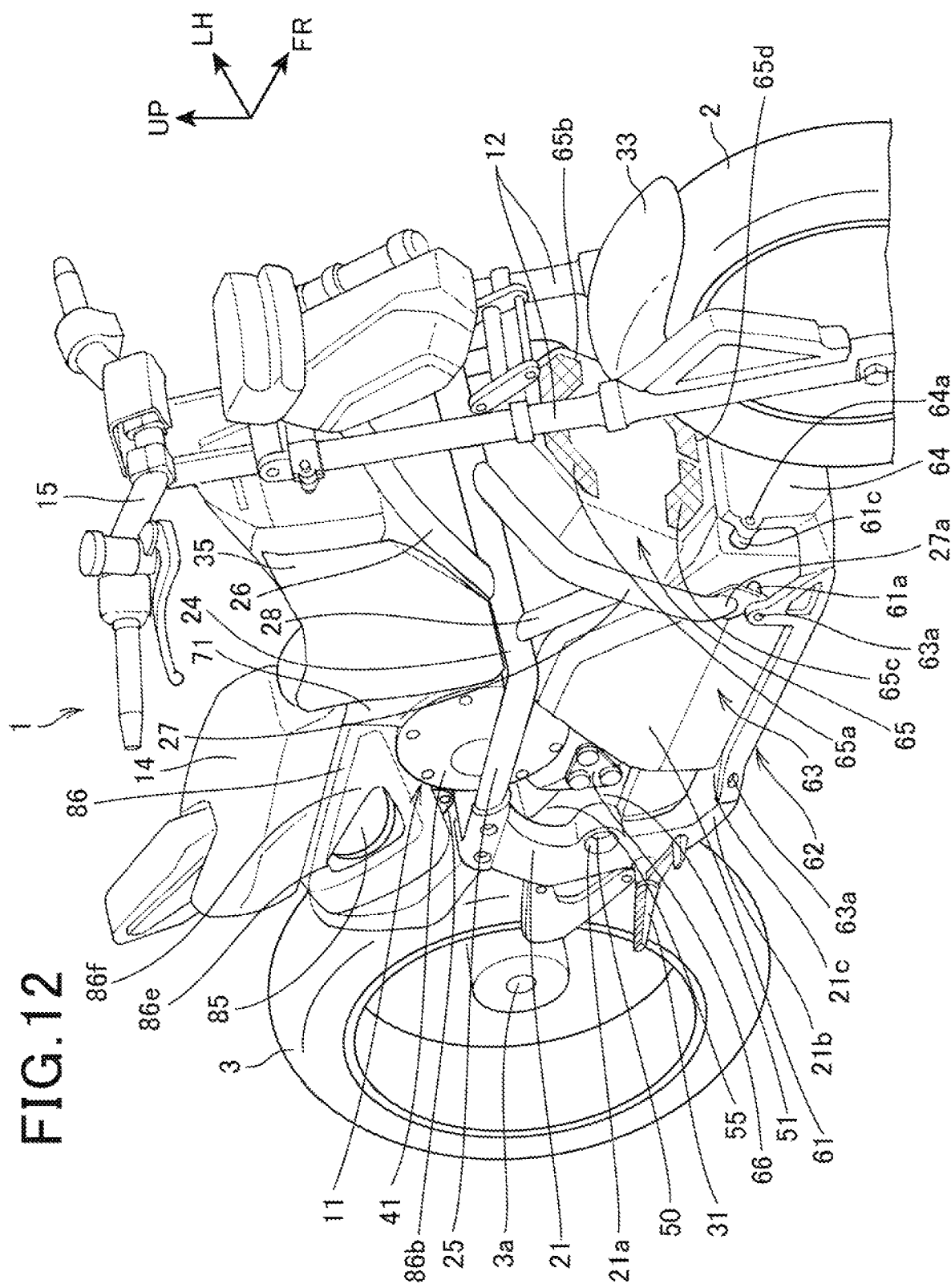
FIG. 12 is a perspective view of the electric motorcycle according to the embodiment of the present invention viewed from the right front.
Figure 13:
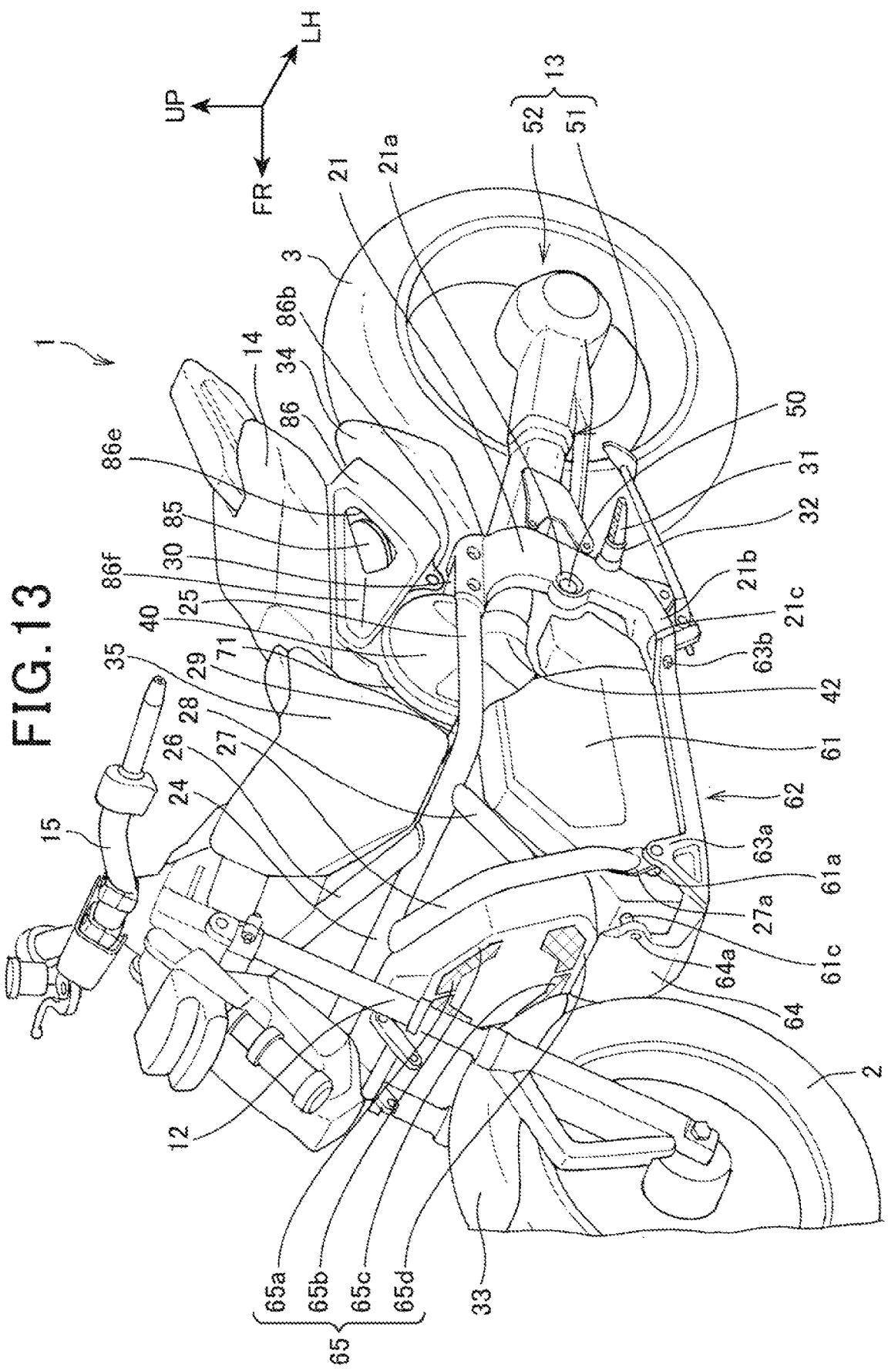
FIG. 13 is a perspective view of the electric motorcycle according to the embodiment of the present invention viewed from the left front.
Figure 14:
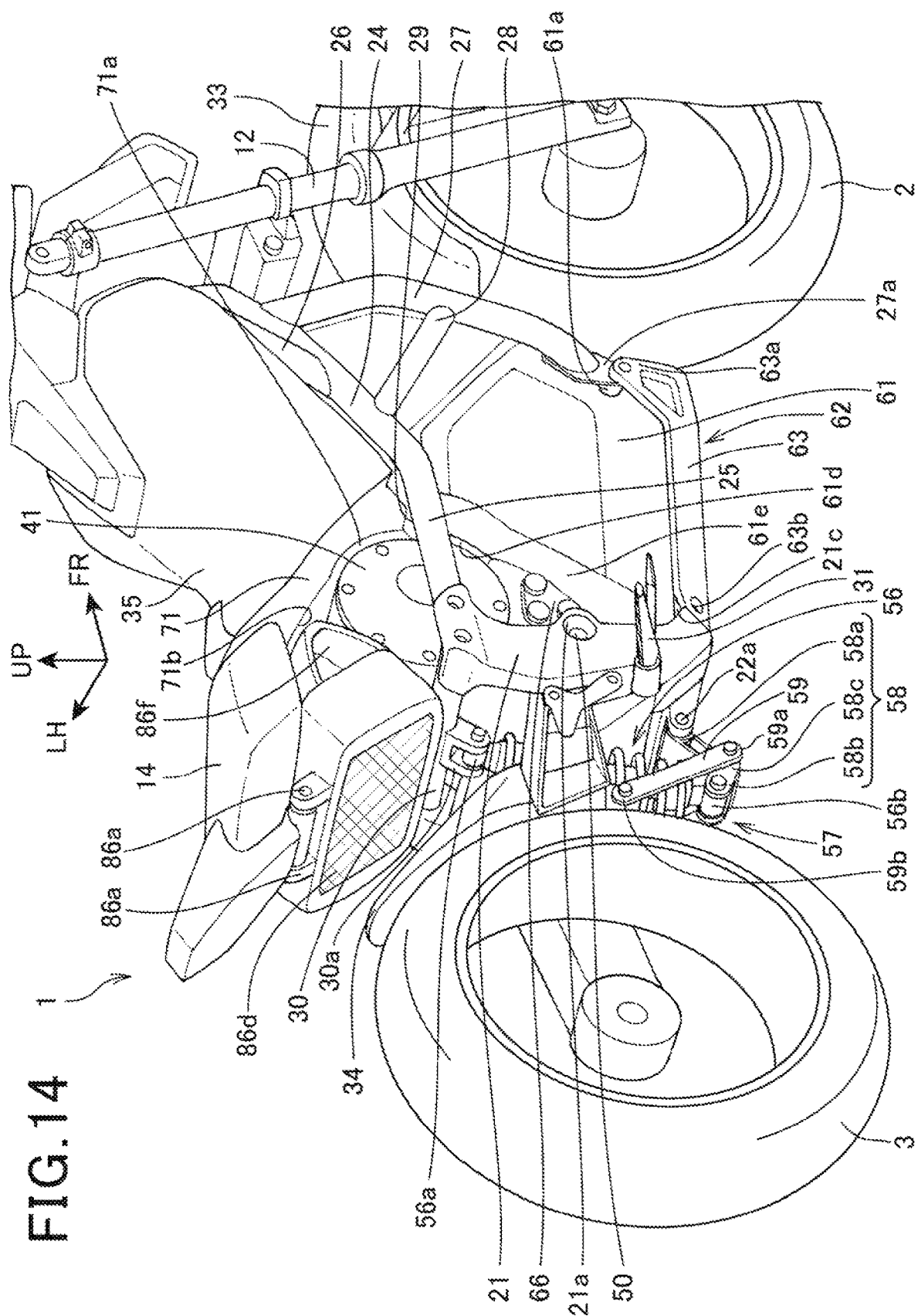
FIG. 14 is a perspective view of the electric motorcycle according to the embodiment of the present invention viewed from the right rear.
Figure 15:
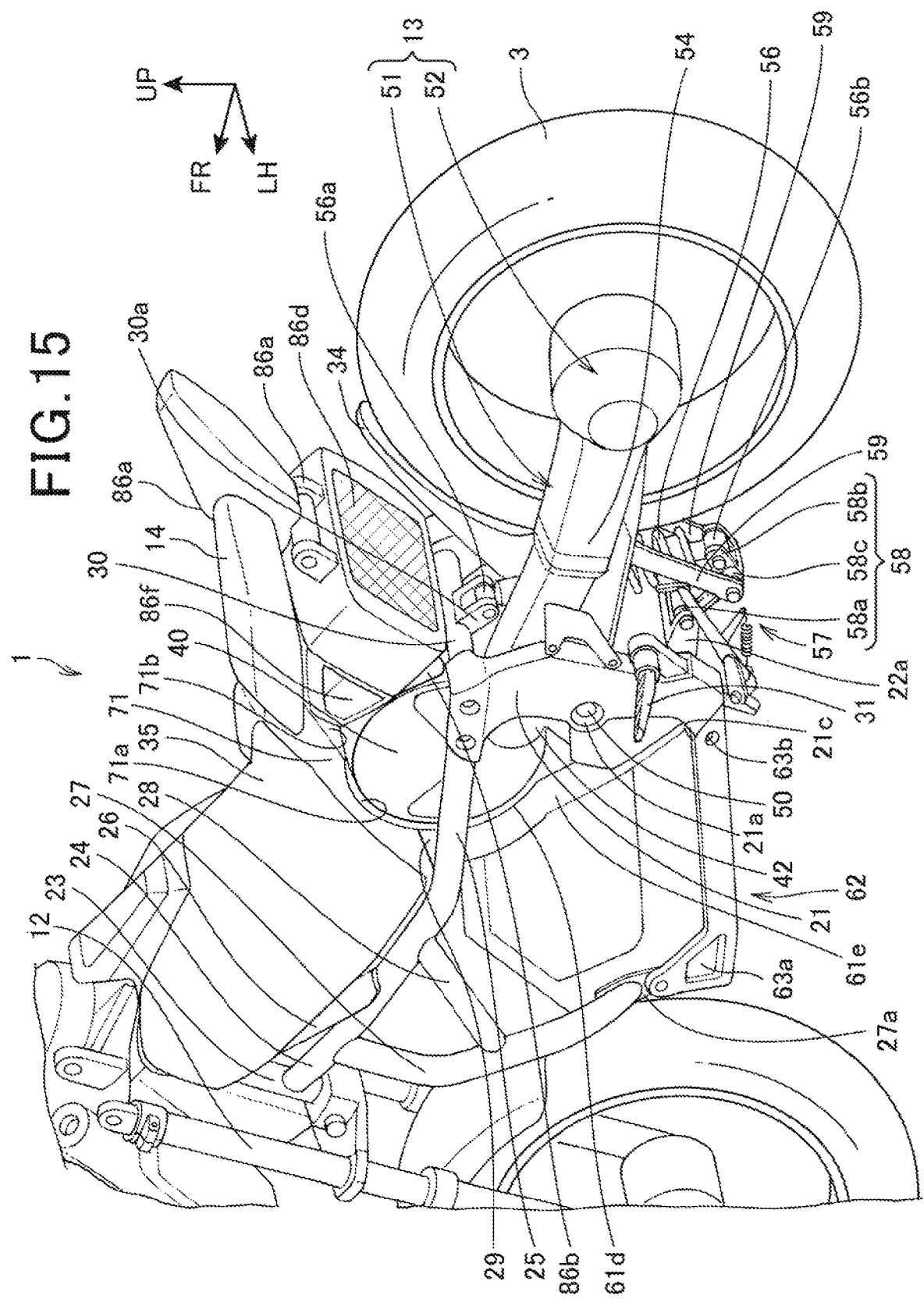
FIG. 15 is a perspective view of the electric motorcycle according to the embodiment of the present invention viewed from the left rear.
Figure 16:
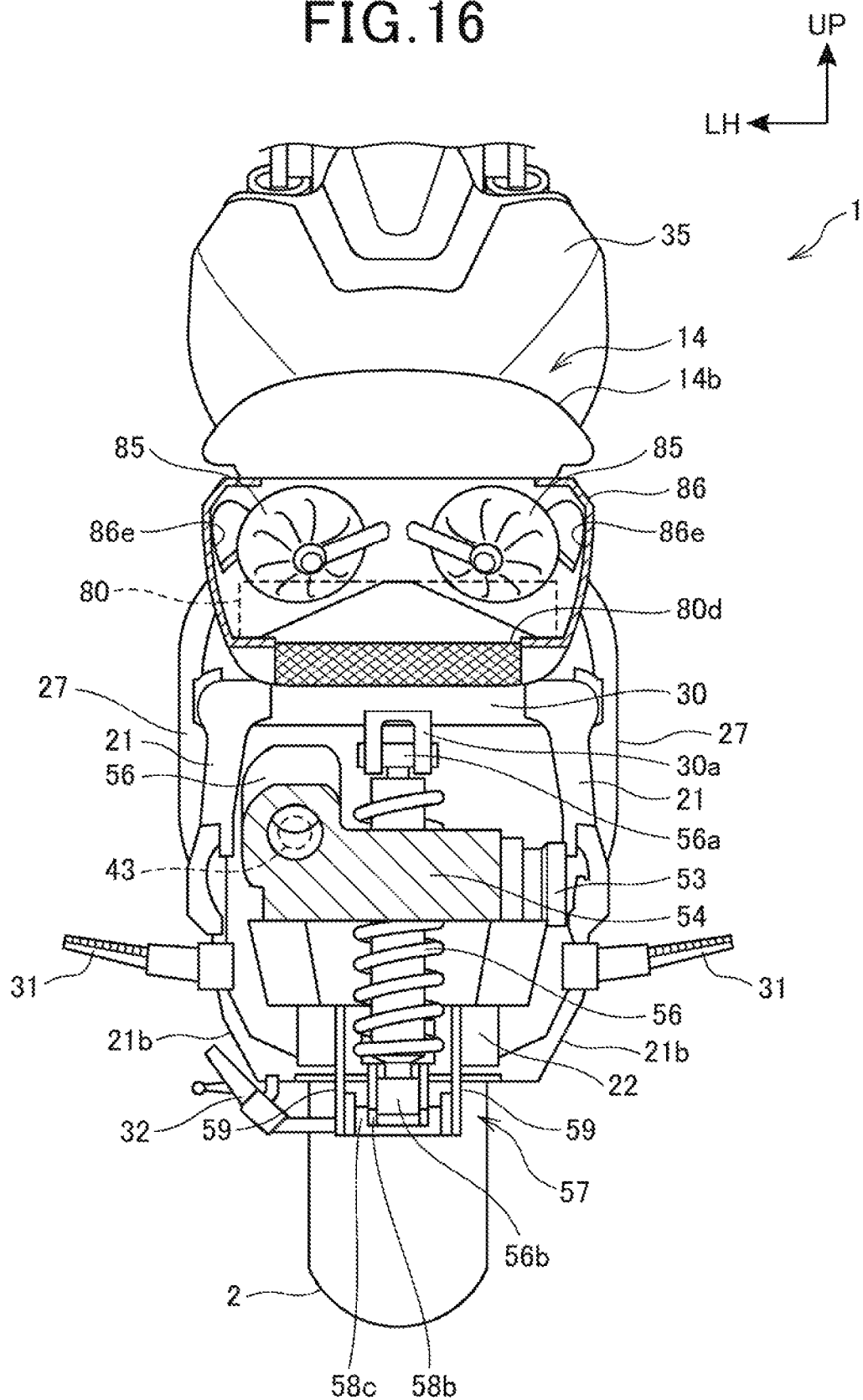
FIG. 16 is an A-A sectional view of FIG. 2.

FIG. 12 is a perspective view of the electric motorcycle 1 viewed from the left front. FIG. 13 is a perspective view of the electric motorcycle 1 viewed from the right front. FIG. 14 is a perspective view of the electric motorcycle 1 viewed from the right rear. FIG. 15 is a perspective view of the electric motorcycle 1 viewed from the left rear. FIG. 16 is an A-A sectional view of FIG. 2.

As shown in FIG. 12 and FIG. 13, an air intake section 65, a front surface part of which has an octagonal shape, is formed in the front of the battery cover 61. In the air intake section 65, traveling air is taken in during traveling from opening-like air intake ports 65a to 65d formed in upper, lower, left, and right parts. The traveling air entering from the air intake ports 65a and 65d flows in the battery cover 61 and cools the battery 60.

As shown in FIG. 14 to FIG. 16, the swing arm 13 is suspended by the vehicle body frame 10 via a tubular rear cushion 56. The rear cushion 56 is disposed in the center in the vehicle width direction between the pivot plates 21, 21. An upper end part 56a of the rear cushion 56 is axially supported by a coupling section 30a in the center of the rear-side upper cross frame 30.

The rear cushion 56 extends to below the swing arm 13 passing between the arm section 54 on the left side and the reinforcing arm section 55 on the right side. A lower end part 56b of the rear cushion 56 is coupled to a link mechanism 57 coupled to the cross frame 22.

The link mechanism 57 includes a cushion coupling section 58 having an L shape in the vehicle side view and a pair of left and right links 59, 59 turnably axially supported by the cushion coupling section 58. A front end part (one end part) 58a of the cushion coupling section 58 is axially supported by a coupling section 22a in the vehicle width direction center of the cross frame 22. The lower end part 56b of the rear cushion 56 is coupled to a rear end part (the other end part) 58b of the cushion coupling section 58.

Lower ends 59a, 59a of the pair of left and right links 59, 59 having a long plate shape extending upward to the rear are axially supported by a bending section 58c of the cushion coupling section 58. Upper ends 59b, 59b of the links 59, 59 are axially supported by a coupling section 55a in a lower part of the reinforcing arm section 55 (FIG. 4).

In this embodiment, as shown in FIG. 1 and FIG. 2, the fastening sections 63b, 63b on the rear side of the battery case 62 are located below the output shaft 11a of the electric motor 11. A rear end part 60a of the battery 60 is located below the output shaft 11a.

In the battery 60, a portion 60b further on the rear side than the front-side upper cross frame 29 is located further rear downward than the front end part 11b of the electric motor 11. A position in the front-rear direction of the battery 60 overlaps the electric motor 11 in the vehicle side view.

Since the positions of the battery 60 and the electric motor 11 overlap in the front-rear direction, the front end part 11b of the electric motor 11 is located above the battery 60. A space can be effectively used in the electric motorcycle 1 having a limited loading space. The battery 60 is easily disposed even if the battery 60 is increased in capacity and size.

In this embodiment, as shown in FIG. 11, an arcuate recess 60c recessed along the circular outer circumferential shape of the electric motor 11 is formed in a rear end upper part of the battery 60. In this embodiment, the rear end upper part of the battery 60 is a portion of the battery 60 above the pivot shaft 50, below the rear frames 25, 25, and behind the front-side upper cross frame 29 in the vehicle side view.

The front lower part (an arc portion in the positions A3 to A4) 11c of the electric motor 11 is disposed to enter the recess 60c. The battery 60 and the electric motor 11 are easily disposed close to each other. Since the front lower part 11c of the electric motor 11 is located in the recess 60c in the rear end upper part of the battery 60, in the electric motorcycle 1 having a limited loading space, a space is effectively used to obtain an optimum layout.

The battery 60 is formed in a shape including an inclined rear part 60d linearly inclined downward to the rear from the rear end of the recess 60c toward the rear end part 60a in the vehicle side view.

Note that, in the battery cover 61, an arcuate recess 61d and the linear inclined rear part 61e are formed according to the shapes of the arcuate recess 60c and the linear inclined rear part 60d of the battery 60.

In this embodiment, as shown in FIG. 2, the electric motor 11 is located below the seat 14. A lower part of the swing arm 13, by which the drive shaft 43 is supported, is supported by the pivot shaft (a supporting shaft) 50 provided in the pivot plates 21, 21. The pivot shaft 50 piercing through between the pair of left and right pivot plates 21, 21 is disposed below the leading end of the shaft body section 43b of the drive shaft 43. Further, the pivot shaft 50 is disposed below the leading end shaft 43a of the drive shaft 43.

In this embodiment, the front-side tubular section 53 in the front end lower part of the swing arm 13 is supported by the pivot shaft 50 supported in the through-holes (attachment sections) 21a, 21a (FIG. 7 and FIG. 10) at the height substantially in the center of the pivot plates 21, 21.

In this embodiment, the drive shaft 43 on the inside of the swing arm 13 passes above the pivot shaft 50. The drive shaft 43 is disposed upward to the front. The position of the leading end shaft 43a of the drive shaft 43 is high.

In this embodiment, as shown in FIG. 1, the electric motor 11 in a high position disposed below the seat 14 is located on an extended line L1 of the shaft body section 43b of the drive shaft 43. Since the rear lower part (an arc portion in the positions A5 to A7) 11f of the electric motor 11 is located on the extended line L1, the leading end shaft 43a of the drive shaft 43 is disposed near the output shaft 11a of the electric motor 11.

Therefore, in the transmission unit 42, transmission members such as an idle gear interposed between the leading end shaft 43a of the drive shaft 43 and the output shaft 11a of the electric motor 11 are easily reduced. It is possible to suppress a loss of power output from the electric motor 11 and connect the drive shaft 43 to the electric motor 11. The transmission unit 42 is easily made compact.

Figure 17:
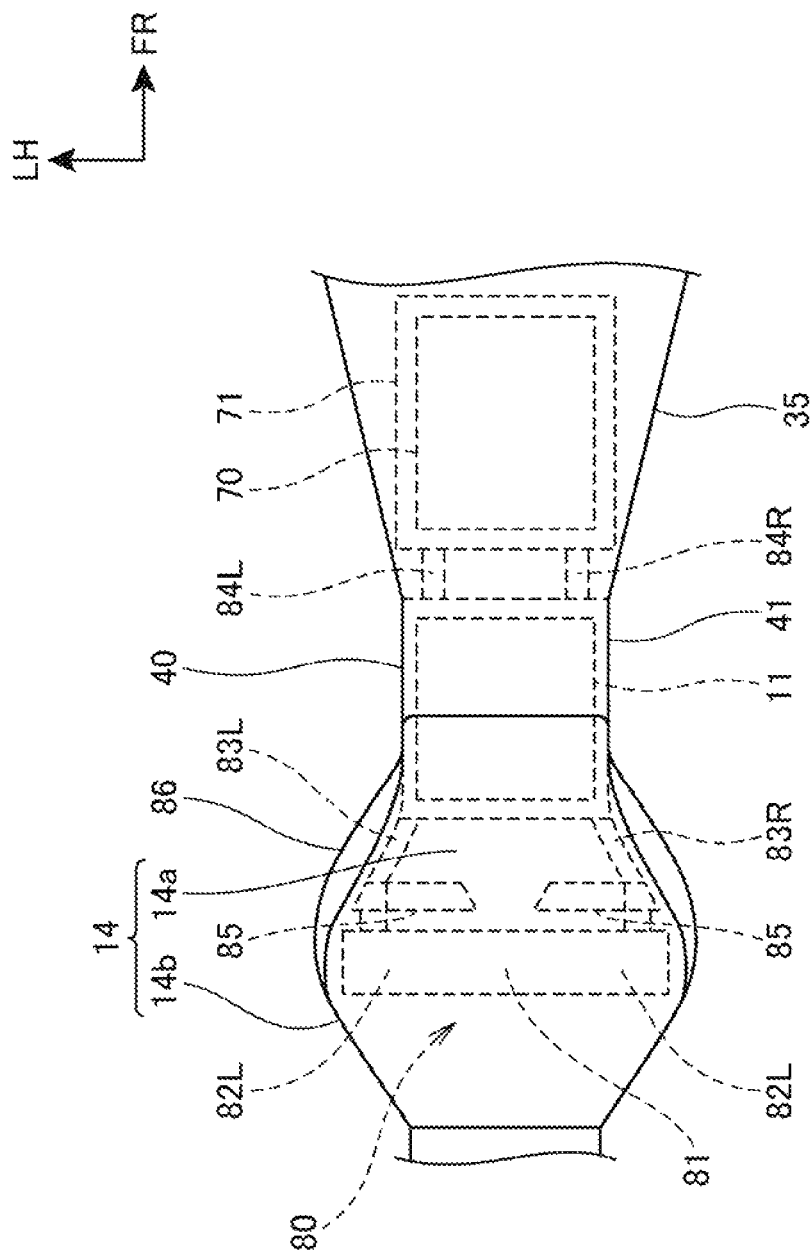
FIG. 17 corresponds to a case in which the electric motorcycle is viewed from above and is a schematic diagram for explaining a path of cooling water flowing between a radiator and a motor case.

FIG. 17 corresponds to a case in which the electric motorcycle 1 is viewed from above and is a schematic diagram for explaining a path of cooling water flowing between a radiator 80 and the motor case 40.

The seat 14 includes the front part 14a, the left-right width of which increases toward the rear, and a rear part 14b formed behind the front part 14a, the left-right width of the rear part 14b decreasing toward the rear. The radiator 80 is disposed below the rear part 14b of the seat 14. The radiator 80 is formed in a plate shape extending in the vehicle width direction and includes a core 81 in the vehicle width direction center and a pair of tanks 82L, 82R provided on the left and the right of the core 81.

A radiator hose 83L is connected to the tank 82L on the left side. A radiator hose 83R is connected to the tank 82R on the right side. The radiator hoses 83L and 83R extend forward and are connected to a rear part of the motor case 40. A water channel (not shown in the figure), through which the cooling water can pass, is formed on the inside of the motor case 40. The cooling water flows between the radiator 80 and the motor case 40 inside via the radiator hoses 83L and 83R.

A pair of left and right radiator hoses 84L and 84R is connected to a front part of the motor case 40. The radiator hoses 84L and 84R extend forward and are connected to the PCU case 71. A water channel (not shown in the figure), through which the cooling water can pass, is formed on the inside of the PCU case 71. The cooling water flows between the motor case 40 inside and the PCU case 71 inside via the radiator hoses 84L and 84R.

A circulation path, through which the cooling water circulates, is configured by the radiator 80, the motor case 40, the PCU case 71, and the radiator hoses 83L, 83R, 84L, and 84R. A pump (not shown in the figure) is connected to the circulation path. The pump (not shown in the figure) is driven, whereby the cooling water circulates. The electric motor 11 and the PCU 70 are cooled by the cooling water.

Heat of the cooling water heated by heat of the electric motor 11 and the PCU 70 is radiated by the core 81 of the radiator 80 and the cooling water is cooled.

A pair of left and right circular radiator fans 85, 85 is disposed in front of the radiator 80 and behind the electric motor 11. The radiator fans 85, 85 are disposed such that air exhaust directions of the radiator fans 85, 85 face the front on the vehicle width direction outer side (FIG. 16). The radiator fans 85, 85 are electrically connected to an ECU (not shown in the figure) and are controlled to be driven by the ECU during low speed, during a temporary stop, and the like. When the radiator fans 85, 85 are driven, the radiator fans 85, 85 set a negative pressure between the radiator fans 85, 85 and the radiator 80 and lead cooing air from the rear of the radiator 80 to the radiator 80. The cooling air that has cooled the cooling water in the radiator 80 is exhausted forward by the radiator fans 85, 85.

As shown in FIG. 1 and FIG. 2, the radiator 80 and the radiator fans 85, 85 are housed in a radiator case 86 having a substantially triangular shape in the vehicle side view and extending in the vehicle width direction more widely than a front part of the seat 14 (FIG. 6 and FIG. 4). An inclined section 86g inclined upward to the rear according to the inclined section 71b formed in the PCU case 71 is formed in a front part of the radiator case 86. The radiator case 86 is disposed in a state in which the inclined section 86g enters the lower side of the inclined section 71b of the PCU case 71 and is disposed in a state in which the positions in the front-rear direction of the radiator case 86 and the PCU case 71 overlap. The radiator case 86 is disposed on the rear side of the PCU case 71 along a lower part 14c of the seat 14. A pair of left and right fastening sections 86a, 86a is formed at the rear end part of the radiator case 86. The fastening sections 86a, 86a are fastened on the lower side of the rear part 14b of the seat 14.

A pair of left and right fastening sections 86b, 86b projecting downward is formed in a lower part of the radiator case 86. The fastening sections 86b, 86b are fastened to projecting piece-like sections to be fastened 30b, 30b (FIG. 7) projecting upward formed in the rear-side upper cross frame 30. The fastening sections 86b, 86b are disposed on the vehicle width direction outer side and fastened to the sections to be fastened 30b, 30b. Note that, in front parts of the fastening sections 86b, 86b, an arcuate recess 86c recessed along the circular outer circumferential shape of the electric motor 11 is formed together with a front lower part of the radiator case 86. The rear upper part (an arc portion in the positions A7 to A1) 11e of the electric motor 11 is disposed to enter the recess 86c. Since the rear upper part 11e of the electric motor 11 is located in the recess 86c in the front lower part of the radiator case 86, the radiator 80 and the radiator fans 85, 85 are easily disposed near the electric motor 11.

A square air vent 86d, through which the cooling air to the radiator 80 can pass, is formed on the rear surface of the radiator case 86 (FIG. 6). An opening section (not shown in the figure) is formed in the recess 86c, which is the front surface of the radiator case 86. The cooling air can move between the radiator case 86 inside and the periphery of the electric motor 11 and the PCU case 71 via the opening section (not shown in the figure).

Substantially triangular opening sections 86e, 86e are formed on the left and the right of the radiator case 86 (FIG. 1 and FIG. 2). The circular radiator fans 85, 85 are supported by the radiator case 86 such that portions on the vehicle width direction outer side of the radiator fans 85, 85 are exposed to the outside via the opening sections 86e, 86e.

Consequently, the cooling air exhausted by the radiator fans 85, 85 can be exhausted to the vehicle body outside via the opening sections 86e, 86e. Heat is less easily filled in the vehicle body. Air can be sent toward the inner side front of the radiator case 86 by the radiator fans 85, 85 in portions on the vehicle width direction inner side not exposed from the opening sections 86e, 86e.

Note that air guide sections 86f, 86f recessed to the vehicle width direction inner side are formed in front parts of the opening sections 86e, 86e of the radiator case 86. When the radiator fans 85, 85 are not driven, the air guide sections 86f, 86f can guide traveling air to the opening sections 86e, 86e and cool the radiator 80.

The radiator case 86 is disposed on the rear upper part 11e side of the electric motor 11. The electric motor 11 is disposed right in front of the radiator fans 85, 85. When the radiator fans 85, 85 are driven to cool the radiator 80, the electric motor 11 can be cooled by exhaust air of the radiator fans 85, 85.

The PCU 70 is disposed in the front of the electric motor 11. Since the PCU 70 is disposed in the front of the radiator fans 85, 85 across the electric motor 11, when the radiator fans 85, 85 are driven to cool the radiator 80, the electric motor 11 and the PCU 70 can be cooled by exhaust air of the radiator fans 85, 85.

As explained above, according to this embodiment applied with the present invention, in the electric motorcycle 1 in which the battery 60 is disposed in the position behind the handle 15 and in front of the seat 14, the electric motor 11 is located below the seat 14 and the lower part of the swing arm 13 is supported by the attachment sections 21a, 21a provided in the pivot plates 21, 21, the drive shaft 43 that transmits a driving force output from the electric motor 11 to the rear wheel 3 being supported by the swing arm 13. Therefore, since the lower part of the swing arm 13 is supported by the attachment sections 21a, 21a provided in the pivot plates 21, 21, the drive shaft 43 faces upward to the front and it is possible to connect the drive shaft 43 without waste to the electric motor 11 located on the extended line L1 of the drive shaft 43 and located below the seat 14.

In this embodiment, the attachment sections 21a, 21a are the through-holes 21a, 21a provided in the height position substantially in the center of the pivot plates 21, 21. The pivot shaft 50 supporting the lower part of the swing arm 13 is supported in the through-holes 21a, 21a. Therefore, the lower part of the swing arm 13 is supported by the pivot shaft 50 supported in the through-holes 21a, 21a provided in the height position substantially in the center of the pivot plates 21, 21. Therefore, the drive shaft 43 passes above the pivot shaft 50. It is possible to direct the drive shaft 43 front upward and bring the drive shaft 43 close to the electric motor 11.

In this embodiment, the radiator 80 and the radiator fans 85, 85 are disposed in the position below the seat 14 and behind the electric motor 11. Therefore, it is possible to cool the radiator 80 with the radiator fans 85, 85 and cool the electric motor 11 located right in front of the radiator 80 with exhaust air of the radiator fans 85, 85.

In this embodiment, the PCU 70 is disposed above the battery 60 and in front of the electric motor 11. Therefore, it is possible to bring a layout of the electric motorcycle 1 having a limited loading space close to the optimum. In particular, since the PCU 70 is located in the front of the radiator fans 85, 85 across the electric motor 11, the radiator fans 85, 85 can cool the radiator 80. The electric motor 11 located right in front of the radiator 80 and the PCU 70 can also be cooled by exhaust air of the radiator fans 85, 85.

In this embodiment, at least the front end part (a part) 11b of the electric motor 11 is located above the battery 60. Therefore, it is possible to bring a layout of the electric motorcycle 1 having a limited loading space close to the optimum.

In this embodiment, the front lower part 11c of the electric motor 11 is located in a rear end upper part 60c of the battery 60. Therefore, it is possible to bring a layout of the electric motorcycle 1 having a limited loading space close to the optimum.

The embodiment explained above only shows an aspect of the present invention and can be optionally modified and applied in a range not departing from the gist of the present invention.

As the swing arm 13, a so-called cantilever configuration in which the arm section 54 is disposed only on one side of the rear wheel 3 is explained. However, the swing arm 13 may have a configuration in which the swing arm 13 includes a pair of left and right arm sections and the rear wheel 3 is supposed between both the arm sections.

REFERENCE SIGNS LIST 3 wheel
11 driving motor
11b part
11c front lower part
13 swing arm
14 seat
15 handle
21, 21 pivot plate
21a, 21a attachment section, through-hole
43 drive shaft
50 pivot shaft
60 battery
60c rear end upper part
70 PCU
80 radiator
85, 85 radiator fan

The invention claimed is:

1. An electric motorcycle in which a battery is disposed in a position behind a handle and in front of a seat, wherein
   a driving motor is located below the seat,
   the driving motor is disposed further forward than a rear end of a frame connecting a head pipe and a pivot plate and is supported by a vehicle body frame in a position overlapping the frame in a vehicle side view,
   the pivot plate extends downward from rear end parts of the frame, and
   a lower part of a swing arm is supported by an attachment section provided in the pivot plate, a drive shaft that transmits a driving force output from the driving motor to a wheel being supported by the swing arm.

2. The electric motorcycle according to claim 1, wherein an output shaft of the driving motor overlaps the frame in the vehicle side view.

3. The electric motorcycle according to claim 1, wherein the attachment section is a through-hole provided in a height position substantially in a center of the pivot plate, and a pivot shaft supporting a lower part of the swing arm is supported in through-hole.

4. The electric motorcycle according to claim 1, wherein a radiator and a radiator fan are disposed in a position below the seat and behind the driving motor.

5. The electric motorcycle according to claim 1, wherein power control unit is disposed above the battery and in front of the driving motor.

6. The electric motorcycle according to claim 1, wherein at least part of the driving motor is located above the battery.

7. The electric motorcycle according to claim 6, wherein a front lower part of the driving motor is located in a rear end upper part of the battery.

\* \* \* \* \*